(12) United States Patent
Pianykh et al.

(10) Patent No.: US 6,909,436 B1
(45) Date of Patent: Jun. 21, 2005

(54) RADIOLOGIST WORKSTATION

(75) Inventors: Oleg S. Pianykh, Baton Rouge, LA (US); David Troendle, New Orleans, LA (US); John M. Tyler, Baton Rouge, LA (US); Wilfrido Castaneda-Zuniga, New Orleans, LA (US)

(73) Assignee: The Board of Supervisors of Louisiana State University and Agrigultural & Mechanical College, Baton Rouge, LA (US)

( * ) Notice: Subject to any disclaimer, the term of this patent is extended or adjusted under 35 U.S.C. 154(b) by 351 days.

(21) Appl. No.: 09/697,992

(22) Filed: Oct. 27, 2000

Related U.S. Application Data

(60) Provisional application No. 60/161,770, filed on Oct. 27, 1999.

(51) Int. Cl.$^7$ .................................................. G09G 5/00
(52) U.S. Cl. ........................ 345/619; 345/581; 345/660; 345/671; 345/781; 345/797
(58) Field of Search .................................. 345/660, 600, 345/581, 619, 620, 781, 797, 671, 617

(56) References Cited

U.S. PATENT DOCUMENTS

| | | | | |
|---|---|---|---|---|
| 5,321,807 A | * | 6/1994 | Mumford | 345/543 |
| 5,465,362 A | * | 11/1995 | Orton et al. | 709/107 |
| 5,546,103 A | * | 8/1996 | Rhodes et al. | 345/781 |
| 5,740,801 A | * | 4/1998 | Branson | 600/407 |
| 6,266,054 B1 | * | 7/2001 | Lawton et al. | 345/581 |
| 6,407,747 B1 | * | 6/2002 | Chui et al. | 345/660 |

* cited by examiner

Primary Examiner—Kimbinh T. Nguyen
(74) Attorney, Agent, or Firm—Jones, Walker, Waechte, Poitevent, Carrere & Denegre, L.L.P.

(57) ABSTRACT

A radiologist workstation program capable of performing the methods of: (a) losslessly compressing an image by using a sample of pixel neighborhoods to determine a series of predictive coefficients values related to the pixel neighborhoods; (b) lossy compressing an image to a predetermined ratio by adjusting the quality parameter in a quality controlled compression routine; (c) adjusting the compression ratio of image data based upon the available bandwidth of a network link across which the image is transmitted; (d) encapsulating audio data in a DICOM object and selectively retrieving the data; (e) performing an improved integer based ray tracing method by establishing a ray angle from an observer position and adjusting the ray angle such that the directional components of the ray angle are rational numbers; and (f) reducing flicker caused by a magnifying window moving across an image on the display screen by determining what portion of a first window position is not covered by a new window position and restoring from memory that portion of the image which corresponds to the portion of the first window not covered by the second window.

8 Claims, 15 Drawing Sheets

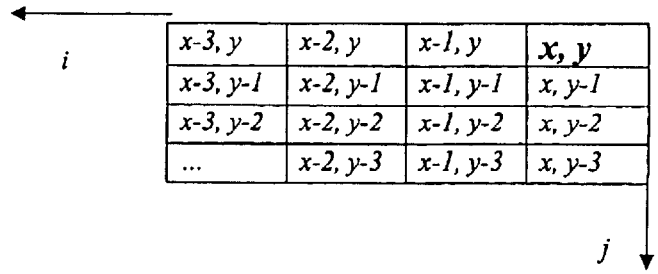

FIGURE 1

```
// for each pixel in the NxM image
for(x=1; x<N; x+=1)
{
    for(y=1; y<M; y+=1)
    {

// Consider I(x,y), I(x-1,y), I(x,y-1), ... neighborhood of (x,y)
        // If some if I(x-I,y-j) fall out of image boundaries, replace them by 0
        // Do not consider reference pixels (I(x-i,y-j) where i,j=0)
        // Apply (6) to compute e(x,y)
        sum_kI=0;
        for(i=0; i<a; i+=1)
        {
            for (j=0; j<a; j+=1)
            {
                if(I(x-i,y-j)==out of bounds pixel) I(x-i,y-j)=0;
                if(i==0 && j==0) continue;
                sum_kI=sum_kI+k_ij*I(x-i,y-j);
            }
        }
        sum_kI=sum_kI>>10;
        e(x,y)=I(x,y)-sum_kI;
    }
}
```

FIGURE 2

```
int RTJPEG::CompressRT(BYTE* input, BYTE* output, double ratio, double maxtime,
int bpp=1, bool rgb=false)
{
int size_orig = Size(input);    // original image size in bytes
// Set max and min quality values
int q0=5;         // 5% quality
int q1=95;        // 95% quality
// Find respective compression ratios. Higher ratio corresponds to lower quality
double r0 = size_orig/Compress(input,output,q0, int bpp=1, bool rgb=false);
// highest ratio
double r1 = size_orig/Compress(input,output,q1, int bpp=1, bool rgb=false);
// lowest ratio
// Return if proposed ratio is smaller than the smallest possible
if(ratio<r1) return JPEG::Compress(input, output, q1);
// Return if proposed ratio is larger than the largest possible
if(ratio>r0) return Compress(input, output, q0);
// Start timer
clock_t start, finish;
start = clock();
// Start iterative process to estimate the quality value
double duration=0;       double r = ratio;
while (duration<maxtime)
{
// Use linear quality estimate
int q = q0+(r-r0)*(q1-q0)/(r1-r0);
// Alternatively, a bi-section estimate can be used in the previous line:
// int q = (q0+q1)/2;
// Update estimated corresponding compression ratio value
r = size_orig/Compress(input,output,q);
// Update compression and quality boundaries
if(ratio>r)
{
        r1 = r;       if(q1==q)     break; // convergence
        q1 = q;
}
else
{
        r0=r;         if(q0==q)     break; // convergence
        q0=q;
}
// Update timer
finish = clock();             duration = (double)(finish - start) / CLOCKS_PER_SEC;
}       // end of iterative process
// Compress
return Compress(input, output, q);
}
```

FIGURE 3

```
//      It is assumed that ApplicationEntityList ael and DICOMObject d variables
//      have been already initialized based on the present network
//      configuration and the data to be sent.

// Find current remote application entity, to which data must be sent
ApplicationEntity ae = ael.GetCurrentEntity();

// Create PDU connection
PDU pdu;

// Start network performance timer
NetworkTimer nt;

// Find data size to be sent
nt.GetDataSize(d);
nt.StartTimer()

// Send data to current application entity
pdu.Send(d,ae);

// Stop the timer, evaluate observed network bandwidth, and store it into ae
nt. EstimateCurrentBandwidth(ae);
```

FIGURE 4

```
//      It is assumed that ApplicationEntityList ael and DICOMObject d variables
//      have been already initialized based on the present network
//      configuration and the data to be sent.

// Compress DICOM object to accommodate current network bandwidth
int dsize = d.GetSize();
int ntime = ae.GetDownloadTime(); // maximum allowable download time
int ctime = dsize / ae.GetCurrentBandwidth(); //time we'll spend with current bandwidth
if(ctime > ntime) // low bandwidth, we need compression
{
        if(ae.CanAcceptLossy())      // we can use lossy compression
        {
            // Compress with maximum ratio allowed
            double ratio = min(ctime/ntime, ae.GetMaximumCompressionRatio());
            d.Compress(false,ratio);
        }
        else    if(ae.CanAcceptCompressed()) // only lossless, try our best
        {
            d.Compress(true, /*ignored*/1.0);
        }
        else    // no JPEG compression allowed, do nothing
        {
        }
}
else // network is fast enough, do not have to compress
{}

// Create PDU connection
PDU pdu;

// Send compressed data to current application entity
pdu.Send(d,ae);
```

FIGURE 5

```
class AccurateTimer
{
private :
        int Initialized;
        __int64 Frequency;
        __int64 BeginTime;
public :   AccurateTimer()    // constructor
        {
                // get the frequency of the counter
                Initialized = QueryPerformanceFrequency( (LARGE_INTEGER
*)&Frequency );
        } void StartTimer()    // start timing
        {
                if( ! Initialized ) return 0;   // error - couldn't get frequency
                // get the starting counter value
                QueryPerformanceCounter( (LARGE_INTEGER *)&BeginTime );
                return
        } double EndTimer()    // stop timing and get elapsed time in seconds
        {
                if( ! Initialized )      return 0.0; // error - couldn't get frequency
                // get the ending counter value
                __int64 endtime;
                QueryPerformanceCounter( (LARGE_INTEGER *)&endtime );
                // determine the elapsed counts
                __int64 elapsed = endtime - BeginTime;
                // convert counts to time in seconds and return it
                return (double)elapsed / (double)Frequency;
        }
```

FIGURE 6

```
bool SoundRecorder::Record(int sf, bool stereo, int max_time=300, int
max_size=1000000, int format=WAV)
{
        DWORD dwReturn;

// Open a waveform-audio device with a new file for recording.
        if(!OpenMCI()) return;

MCI_RECORD_PARMS mciRecordParms;
        // Set recording parameters here as fields in mciRecordParms
        mciRecordParms.dwFrom = 0;
        mciRecordParms.dwTo = max_time;
                ....
        mciRecordParms.dwCallback = (DWORD)(this->GetSafeHwnd());

// Record
        if (dwReturn = mciSendCommand(m_Device.wDeviceID, MCI_RECORD,
        MCI_FROM | MCI_NOTIFY, (DWORD)(LPVOID) &mciRecordParms))
        {
                AfxMessageBox(ErrorMCI(dwReturn, "Recording error: "));
                mciSendCommand(m_Device.wDeviceID, MCI_CLOSE, 0, NULL);
                return false;
        }
        return true;
}
```

FIGURE 7

```
void SoundRecorder::Insert(DICOMObject& dob)
{
        BYTE* sound;
        if(GetFormat() != MP3) // we have to encode the sound
        {
                SoundEncoder se;
                if(se.Encode(GetSound(), GetFormat(), sound)
                {
                        return false;   // we failed to encode
                }
        }
        // Store sound bytes into odb object
        ........
        return true;
}
```

FIGURE 8

RADIOLOGIST WORKSTATION

This utility patent application claims benefit of provisional patent application No. 60/161,770, filed on Oct. 27, 1999.

Appendix 1 is a computer program listing appendix consisting of two compact discs, each having a complete copy of the source code executing the functions described in the accompanying specification. The contents of the compact discs are incorporated by reference herein. High level folders on the compact discs are:

| Name | Size | Date Last Modified |
| --- | --- | --- |
| Dicom_h | 37.4 kB | Oct. 27, 2000 |
| DICOMLib | 2.05 MB | Oct. 27, 2000 |
| GUILib | 58.3 kB | Oct. 27, 2000 |
| hlp | 188 kB | Oct. 27, 2000 |
| Image | 81.6 kB | Oct. 27, 2000 |
| Query | 139 kB | Oct. 27, 2000 |
| RayTraceDialog | 381 kB | Oct. 27, 2000 |
| res | 222 kB | Oct. 27, 2000 |
| Tools | 6.65 kB | Oct. 27, 2000 |
| WinMetheusLib | 199 kB | Oct. 27, 2000 |
| Zlib113 | 135 kB | Oct. 27, 2000 |

BACKGROUND OF INVENTION

The present invention relates to improvements in a Picture Archiving and Communications System (PACS). In particular, the invention relates to a set of software tools, which will create a client-server PACS significantly enhancing the use, transfer, and analysis of medical images stored in a medical image database.

PACS operating upon medical image databases almost universally comply with the Digital Imaging in Communication and Medicine (DICOM) standard. DICOM is the widely accepted standard for digital medical data representation, encoding, storage and networking. The DICOM standard is specified in 14 volumes (traditionally numbered as PS3.1–PS3.14), available from National Electrical Manufacturers Association (NEMA) and is well known to those working in the digital medical imaging area. The standard provides strict guidelines for medical digital imaging, and is supported by virtually all present medical system manufacturers. The DICOM standard is object-oriented and represents each information entity as a set of Data Elements (such as Patient Name, Image Width) with their respective values encoded with DICOM Dictionary (PS3.5–PS3.6). While there are numerous existing PACS with many specialized features, these PACS could be enhanced with new forms of data compression and other features rendering the PACS more efficient to the user.

Existing PACS have included methods of lossless compression, such as the well-known Joint Photographer Experts Group (JPEG) algorithm. Lossless compression is naturally a more limited form of compression since it is necessary to preserve all information in the image. Because the degree of compression is more limited, there is always a need in the art to provide more efficient methods of losslessly compressing image data. Therefore, the present invention provides an improved method of lossless compression.

In addition to JPEG lossless compression, DICOM provides a method of JPEG lossy compression. DICOM support for the standard lossy JPEG compression can be implemented with an object-oriented JPEG class having the following Compress method:

int JPEG::Compress(BYTE* input, BYTE* output, int quality, int bpp=1, bool rgb=false)

wherein the parameters of this method are:
    BYTE* input—a pointer to the original image pixel array,
    BYTE* output—a pointer to the compressed image pixel array
    int quality—compression quality
    int bpp—bytes per pixel in the original image
    int rgb—color flag of the original image (true if a color image is given, and false for grayscale).

The function "Compress" returns an int or integer value which is the size of the compressed image (i.e. the size (number of bytes) of the output array). Naturally, in lossy compression, the amount of compression will correspond to a certain amount of information loss in the original image. In standard JPEG, the amount of information loss in the Compress function is specified with JPEG quality parameter, which ranges from 0–100%. A quality=100% corresponds to minimal loss and low compression ratios, while a smaller quality percentage value corresponds to a higher loss and a higher compression ratio. The choice of the quality value permits the user to compromise between the perceptional image quality and the compressed image size. However, the main disadvantage of the quality parameter is that it is not directly related to the corresponding compression ratio: i.e., setting quality to 50% will produce different compression ratios for different images. For example, at 50% quality, a low entropy (low information content) image would be compressed much more than a high entropy (high information content) image. Therefore, if one is attempting to compress images with varying information content to the same predefined compression ratio, the quality parameter becomes practically useless. Thus, what is needed in the art and what is provided in one embodiment of the invention described below, is a new JPEG compression method based on a predefined compression ratio, rather than compression quality.

PACS are often implemented on network systems such as Local Area Networks (LANs) and include a server system controlling the transfer of medical image data from storage devices to multiple client systems. Since medical image files are typically large data files, it is not uncommon for simultaneous data requests from multiple client systems to heavily burden the existing bandwidth of the network's data link. Insufficient network bandwidth to accommodate the demand of client systems results in undesirably slow download of data to the client systems. Network bandwidth on any given network can also vary significantly depending on the number of clients currently using the network or other factors placing computational load on the system.

Compressing an image prior to it being transferred across the network is one manner of compensating for insufficient bandwidth. Compressing data on a local computer is typically done much faster than downloading an image from a remote system. Therefore, compressing data by n times before transmission will reduce the download time of that data by nearly n times. As mentioned, the DICOM standard already includes JPEG lossless and lossy compression for local image storage. It may often be possible to alleviate most bandwidth problems by compressing data to a large degree (typically through lossy compression). However, lossy compression results in the loss of some information in the compressed data and this loss may be unacceptable in medical images which are used in certain applications. Even where lossy compression is acceptable, it is desirable to minimize the information loss.

What is needed in the art is a method of maintaining an acceptable download time across a network while compressing image data only to the degree necessary to maintain that download time. In other words, a method of adjustably compressing data in response to the available network bandwidth.

Another shortcoming of existing PACS is their failure to encapsulate audio information in DICOM objects. Audio information is often used in medical practices to record reports, clinical sounds, and the like. However, unlike image data, the DICOM standard provides no support for sound data encapsulation in DICOM objects. Typically, DICOM compliant systems store and interpret audio data separately, with the respective DICOM image object containing a pointer to the present audio data location. The main deficiency of this approach is that the audio data is separated from the rest of the DICOM information. Thus, the audio data can be lost, it is not available at the same time as the image, and its retrieval involves additional processing steps. However, the generality of the DICOM standard allows representation of any information as a part of a DICOM object. Therefore, it would be a significant advancement in the art to provide a method for encapsulating audio information in a DICOM object.

Ray Tracing is another software tool commonly used in medical imaging. Ray tracing is a method of analyzing three-dimensional data in order to produce a properly shaded three dimension appearing image on a monitor. As described in more detail below, ray tracing performs two basic steps, ray generation and data volume traversal, for all of (or at least a large number of) the pixels on the monitor displaying the image. This repetitive computational processing thus requires unusually high computing power and consumes an undesirable amount of processing time. Improving the speed at which ray generation and data volume traversal are performed would significantly speed up ray tracing image production because of the repetitive nature of these two operations.

SUMMARY OF THE INVENTION

The present invention provides a method of lossless image compression comprising the steps of (a) taking a sample of pixel neighborhoods from an image file, (b) using the sample of pixel neighborhoods to determine a series of predictive coefficients values related to the pixel neighborhoods, (c) determining prediction residual values based on the coefficients values, and (d) losslessly compressing the prediction residual values.

The invention also provides a method of adjusting the quality parameter in a quality controlled compression routine in order to compress image data a predetermined compression ratio. The method comprises the steps of: (a) receiving a desired compression ratio, (b) selecting an estimated quality value, (c) compressing the image data based on the quality value and calculating an intermediate compression ratio from the compressed image data, (d) adjusting the quality value in iterative steps and recalculating the intermediate compression ratio, (e) returning a final quality value after a predetermined time period or when the predefined ratio is achieved, and (f) compressing the image data to the final quality value using the quality controlled compression routine.

The invention also includes a method of adjusting the compression ratio of image data based upon the available bandwidth of a network link across which the image is transmitted. The method comprises the steps of: (a) determining the size of an image to be transmitted, (b) selecting a desired download time for downing loading the image from a network link, (c) determining a current download time based upon current network conditions, and (d) compressing the image if the current download time is greater than the desired download time.

The invention also includes a method of encapsulating audio data in a DICOM object and selectively retrieving the data. The method comprises the steps of: (a) providing a DICOM compliant recording function having parameters representing a recording time and a record size of the audio data, and (b) providing a DICOM compliant playback function having a parameter representing a playback start position.

The invention also includes an improved integer based ray tracing method for constructing two-dimensional images from three-dimensional data. The ray tracing method comprises the steps of: (a) receiving a set of three-dimensional image data containing an object of interest, (b) receiving an observer position, (c) establishing a ray angle from the observer position, through the three-dimensional data, to a two-dimensional image plane, (d) adjusting the ray angle such that the directional components of the ray angle are rational numbers, (e) back projecting from a selected number of picture elements on the two dimensional image plane a series of rays parallel to the ray angle, the rays passing though the three-dimensional image data to origin points, (f) for each ray intersecting the object of interest, determining a relative distance between the origin point and a point of contact where a ray intersects the object of interest, (g) determining a surface angle relative to the origin point for each of the points of contact, and (h) adjusting the intensity of the picture elements on the two dimensional image plane relative to the surface angle of the points of contact.

The invention also includes a method of reducing flicker caused by a magnifying window moving across an image on the display screen. The method comprises the steps of: (a) storing the image in the memory, (b) storing a first window position in the memory, (c) reading a second window position, which overlaps the first window position, (d) determining what portion of the first window position is not covered by the new window position, and (e) restoring from memory that portion of the image which corresponds to the portion of the first window not covered by the second window.

BRIEF DESCRIPTION OF THE DRAWINGS

FIG. 1 is an illustration of a pixel neighborhood.

FIG. 2 is a pseudocode segment illustrating the predictive lossless compression method of the present invention.

FIG. 3 is a pseudocode segment illustrating the ratio based lossy compression method of the present invention.

FIG. 4 is a pseudocode segment illustrating the method for determining current network bandwidth for application entities.

FIG. 5 is a pseudocode segment illustrating the method for determining if compression is necessary and to what degree compression should be carried out.

FIG. 6 is a pseudocode segment illustrating a timing method employed in the present invention.

FIG. 7 is a pseudocode segment illustrating a sound recording function employed in the present invention.

FIG. 8 is a pseudocode segment illustrating the method for implementing the SoundRecoder object of the present invention.

FIG. 13($b$) is a graphical representation of an individual cell within a three-dimensional data set being traversed by a ray.

FIG. 15($b$) is a graphical representation of an individual cell within a three-dimensional data set being traversed by a ray in the method of the present invention.

DETAILED DESCRIPTION

Figure 9:
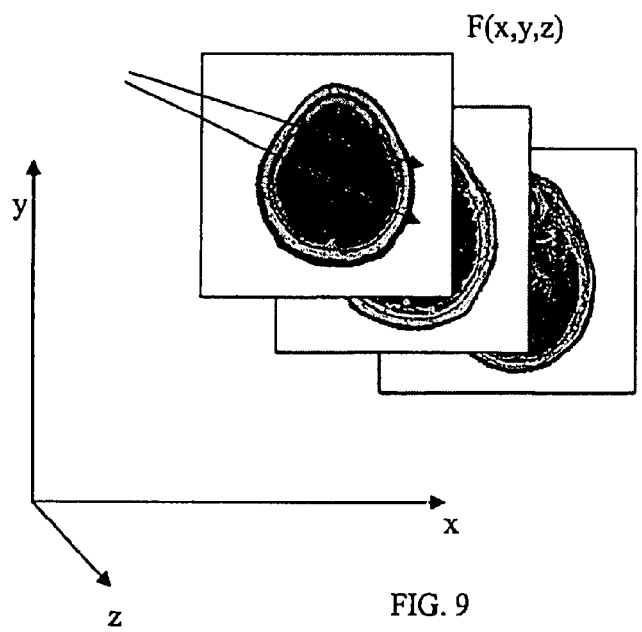
FIG. 9 is a conceptual representation of a three-dimensional data set.

Where appropriate, the terminology used in the following description is a part of the DICOM standard and is well known to persons of ordinary skill in the medical imaging art. For the embodiments described herein, the definitions of various DICOM classes and functions are presented in C++ object-oriented syntax and the functional interface of these classes is illustrated in the function definitions and pseudocode appearing herein.

Enhanced (Predictive) Lossless Compression.

One aspect of the present invention is to provide an improved lossless compression method. Lossless compression is the compression of data without any informational loss—i.e., the original data (for example an image) can be completely recovered from its compressed version. One advantageous method of implementing a lossless compression method for images is to use natural inter-pixel correlation, i.e. the tendency for neighboring pixels in an image to have close numerical values. If an N×M digitized image is represented as an N×M matrix I(x,y), where the value of I(x,y) represents pixel's intensity at the point (x,y), a predictive model for each pixel's intensity can be written as:

$$I(x, y) = \sum_{0 \leq i,j \leq a} c_{i,j} I(x - i, y - j) + e(x, y), \quad (1)$$

where $c_{ij}$ are coefficients, and $e(x,y)$ is the prediction residual.

FIG. 1 illustrates a set of pixels, which may be referred to as a pixel neighborhood. The left-bottom neighborhood adjacent to the reference pixel (x,y) will be considered the I(x–i,y–j) neighborhood where i and j are equal to the neighborhood size a. In FIG. 1, a is equal to 3.

If $c_{ij}$ are known, equation (1) illustrates how I(x,y) can be losslessly recovered from its left-bottom pixel neighborhood I(x–i,y–j), and a small error e(x,y). Thus, the only information needed to represent the compressed image is the values e(x,y) and the coefficients $c_{ij}$. Since the values of e(x,y) can usually be efficiently and losslessly encoded with entropy-based compression (such as Huffman compression), a significant degree of compression of the original image may be realized using the method of the present invention.

Modern lossless compression techniques such as JPEG and JPEG-LS use predefined coefficient values and relatively small neighborhoods of a=1 or a=2 pixels. However, it has been discovered that extending the neighborhood size (increasing the a value) to a=3 and a=4, and choosing $c_{ij}$ based on the given image produces substantially better compression ratios. These superior compression ratios are on the order of a 20%–30% increase over JPEG techniques. This is a significant improvement when dealing with lossless compression.

The compression technique of the present invention generally comprises four steps. First, the image will be sampled for a series of pixel neighborhoods from which the prediction coefficients $c_{ij}$ will be calculated. Second, the coefficients $c_{ij}$ will be determined by linear regression. Third, equation (1) will be used to compute e(x,y) for each pixel. Lastly, the values for e(x,y) will be losslessly compressed.

Sampling the Image for Pixel Neighborhoods.

In order to compute $c_{ij}$ in equation (1), a population of pixel neighborhoods must be chosen. Naturally, the minimum number of independent samples required must be at least the number of coefficients sought to be calculated. While the maximum number of samples could equal the number of pixels in the entire image, this sampling strategy would become excessively time-consuming. A preferred alternative is to choose a set of sampling neighborhoods $(x_s, y_s)$, where S is the total number of samples and s represents a particular sampling index ranging from 1 to S. The set of S samples may be obtained by sampling the image in a uniform manner using a predetermined sampling step d. Thus, it will be readily apparent how the following pseudocode would operate to select a set of samples:

```
s=1;
for(x=1; x<N; x+=d)
{
    for(y=1; y<M; y+=d)
    {
        Consider the current point (x,y) as the right-top point of
        the next neighborhood sample #s;
        Increment s=s+1;
    }
}
```

This routine will produce S=NM/$d^2$ samples with each sample being an [(a+1)×(a+1)]–1 set of adjacent pixels from the original image. As suggested above, the value of d must be chosen to insure a sufficient number of samples to solve for the number of coefficients $c_{ij}$ to be computed from equation (1). This requires that S obey the inequality $$S = NM/d^2 > (a+1)^2, \quad (2)$$

which in turn leads to the constraint $$d < d_0 = \sqrt{NM}/(a+1). \quad (3)$$

For practical purposes, and with large images, one may choose smaller values of d (i.e. more neighborhood samples) to insure a more accurate approximation of $c_{ij}$ from the samples applied to equation (1). One preferred embodiment of the invention uses a sampling step d governed by the relationship $d = \max(1, d_0/10)$.

Finding $C_{ij}$ with Linear Regression

Equation (1), taken over all samples s, results in a typical linear regression problem that can be resolved with the well-known least-squares approach. The coefficient values $c_{0,1}, c_{1,0}, c_{1,1}, \ldots, c_{0,0}$ may be chosen to minimize the sum of squared errors $e(x_s, y_s)$ in equation (1) over all the neighborhood samples. The steps of solving for the coefficients $c_{ij}$ may be best visualized using matrices with the following notations:

Vector $C = [c_{0,1}, c_{1,0}, c_{1,1}, \ldots, c_{0,0}]$—unknown prediction coefficients Vector $V = [I(x_1, y_1), I(x_2, y_2), \ldots I(x_s, y_s)]^T$—left-hand parts of (1) for each sample s.

Vector $W_{ij} = [I(x_1-i, y_1-j), I(x_2-i, y_2-j), \ldots I(x_s-i, y_s-j)]^T$—right-hand parts of (1) for each samples s and each (ij) pair.

Equation (4) illustrates how equation (1) may be rewritten as the matrices $V = C[W_{0,1}, W_{1,0}, W_{1,1}, \ldots, W_{0,0}] = CW$, and, after multiplication by $W^T$, may be written as $$VW^T = C(WW^T) = CF \quad (4)$$

after which C may be solve for as $$C = (VW^T)(WW^T)^{-1} = (VW^T)(F)^{-1} \quad (5)$$

Matrix F has f×f coefficients $F_{p,q}$, where $f = (a+1)^2 - 1$. Computing C has two basic steps. First, the inversion of this matrix F is determined. Once $F^1$ is found, coefficients C may be determined from equation (5). Typically, the calculations may be simplified by quantizing the coefficients $C_{ij}$ into an integer form represented by $k_{ij}$. This may be accomplished by multiplying $c_{ij}$ by $2^{10}$ or 1024. Thus, $k_{ij} = [1024 * c_{ij}]$ or $c_{ij} = k_{ij}/1024$, or in matrix notation, $C = K/1024$.

Most practically, the step of actually determining $F^1$ will not be carried out, but instead equation (4) will be solved using Integer Gaussian elimination. As above, C is first quantized by multiplying both sides in equation (4) by 1024:

$$(1024 * VW^T) = 1024 * CF = KF$$

and solving $$(1024 * VW^T) = KF$$

for K with traditional Gaussian elimination techniques well known in the art. One suitable software routine for Gaussian elimination is found in "Numerical Recipes in C", 2nd Ed., Press, Teukolosky, Vetterling, and Flannery, Cambridge University Press, 1992, the relevant portions of which are incorporated herein by reference. All vectors in the equation $(1024 * VW^T) = KF$ have integer components, which ensures very fast convergence. A good initial approximation of K may be $K = [512, 512, 0, 0, \ldots 0]$, (corresponding to $C = [0.5, 0.5, 0, 0 \ldots 0]$). It is noted that these values for C are the fixed values used in JPEG compression. Therefore, all iterations of Gaussian elimination beyond this initial estimate of C insure that the resulting coefficients will produce compression ratios superior to JPEG.

Those skilled in the art will recognize it may also be practical to find the $F^1$ coefficients from direct inversion of the F matrix is small (i.e. f<4). For example, if f=2, $F^1$ would be found as:

$$\begin{pmatrix} f_{11} & f_{12} \\ f_{21} & f_{22} \end{pmatrix}^{-1} = \begin{pmatrix} f_{22}/r & -f_{12}/r \\ -f_{21}/r & f_{11}/r \end{pmatrix}, r = f_{11}f_{22} - f_{12}f_{21}.$$

While this approach can be used efficiently for f<4. Once f exceeds 3, it is more practical to use the Gaussian elimination method described above.

Applying Equation (1) to Compute e(x,y).

Once coefficients $c_{ij} = k_{ij}/1024$ are determined, the most efficient manner of determining e(x,y) is to utilize the quantized equivalent of equation (1):

$$I(x, y) = \left( \sum_{0 \leq i \leq a, 0 \leq j \leq a} k_{i,j} I(x-i, y-j) \right) \gg 10 + e(x, y), \quad (6)$$

where >> stands for a 10-bit right shift operation, which is equivalent to division by 1024, but computationally faster in binary systems than standard division operations. The pseudocode seen in FIG. 2 implements the predictive lossless image compression in a manner readily followed by a person of ordinary skill in the programming arts. Note comments indicated by "//".

Losslessly Compressing and Decompressing e(x,y)

Once the integer sequence for e(x,y) has been calculated as above, the e(x,y) sequence will be encoded with any entropy-based coding scheme, such as Huffman compression. The encoded e(x,y) sequence will form the basis of the compressed image file. Additionally, the sequence of $k_{ij}$ is stored as a header of the compressed image.

It will be obvious that decompressing the image file is substantially the reverse of the above described steps. To decompress the image file, one first reads the sequence of $k_{ij}$ coefficients from the compressed image file header. Then the remaining sequence of e(x,y) is then decoded with the entropy based scheme (e.g. Huffman decoding). Finally, the original image I(x,y) may be recovered from e(x,y) and $k_{ij}$ using equation (6) and a procedure substantially the reverse of that seen in the pseudocode.

Real-Time JPEG. Another aspect of the present invention is providing an improved JPEG Compress function. The Compress function should be capable of compressing an image to a predefined compression ratio. This compression ratio-based JPEG is implemented similarly to traditional JPEG, but takes a compression ratio parameter (ratio) instead of the quality parameter. The parameters other than ratio are the same as described above for traditional JPEG Compress function. In the description below, the new function is denominated CompressR:

int RJPEG::CompressR(BYTE* input, BYTE* output, double ratio, int bpp=1, bool rgb=false).

Thus, when a compression ratio is provided, the function will return an integer value that is the original image size compressed by the given ratio. For example, ratio=2.0 means that the original image must be reduced in size by at least one half of its original size.

The present invention also includes a further improvement upon the standard JPEG Compress function. This second modification includes also a time constraint limiting the time during which the function may operate to achieve the desired compression ratio.

int RTJPEG::CompressRT(BYTE* input, BYTE* output, double ratio, double maxtime, int bpp=1, bool rgb=false), where maxtime gives the maximum time in seconds in which the routine is allowed to perform he compression. Of course, given CompressRT function, the previous, CompressR function an be always expressed as CompressR(BYTE* input, BYTE* output, double ratio, int bpp=1, bool rgb=false)
    {
      return CompressRT(input, output, ratio, 1000000, bpp, rgb):
    } where some very large maxtime value (e.g. 1,000,000) is used to indicate that the time constraint is not required.

One manner in which the CompressRT function may be implemented is by using the standard JPEG Compress with an appropriate quality value estimated iteratively to ensure the proposed compression ratio. One example of implementing the CompressRT function in a software routine may be illustrated with the pseudo code seen in FIG. 3.

It will be understood that in the pseudo code of FIG. 3, comment lines are preceded by the "//" symbol. Those skilled in the art will recognize many standard functions presented in C++-type pseudocode; for example the clock( ) function discussed below. The other functions like Size( ) can be easily implemented by those skilled in the art. These standard functions are well known in the software programming art and need not be elaborated upon further.

As indicated above, the CompressRT function will take the parameters ratio and maxtime and return an integer value equal to the size of the compressed image. Viewing FIG. 3, the first step in the CompressRT routine is to determine the size of the original image with a Size( ) function. Next, minimum and maximum quality values (q0 and q1) are set. For illustration purposes only, these values have been set to 5 and 95 respectively. While (q0 and q1) could be initially set to any percentages, 5 and 95 are good initial values and selecting a narrower range should not materially enhance computational speed. Using the standard JPEG Compress function with q0 and q1, respective compression ratios (r0 and r1) corresponding to the minimum and maximum quality values may be determined. This is accomplished by dividing the size of the original image by the size of the image compressed to the qualities q0 and q1. It will be understood that the lowest quality value results in the highest compression ratio r0. Similarly, the highest quality value results in the lowest compression ration r1.

The routine determines whether the desired or predetermined ratio is either lower than the lowest compression ratio (r1) or higher than the highest compression ration (r0). If the first condition of ratio<r1 is satisfied, then even the most quality-preserving compression at q=q1=9% already achieves ratios higher than the desired ratio, therefore the image is compressed to this level, and the CompressRT function exits. If ratio>r0 is true, then lossy JPEG can provide at most a r0 compression ratio. Since the compression ratio ratio is impossible to achieve, the image is compressed to the highest possible r0 level, and the CompressRT function exits.

However, assuming the parameter ratio is within r0 and r1, the routine will begin the steps required to estimate a quality q which corresponds with the desired compression ratio, ratio. Two variables, start and finish of the type clock_t will be declared. Start will be initialized to the present clock value by a standard function such as clocks. A variable duration will be initialized to zero and a variable r will be initialized to the value of ratio. r will serve as an intermediate value of the compression ratio while the routine performs the iterative steps governed by the condition while(duration<maxtime). The first step in the while loop is the estimate of the quality value q. This estimate may be made by any number of methods, with two preferred methods being shown in the pseudo code. The linear estimate uses the parameters q, q0, q1, r, r0, and r1 in the equation $q=q0+(r-r0)*(q1-q0)*(r1-r0)$. Alternatively, a simpler bi-section estimate may be obtain by the equation $q=(q1+q0)/2$. Obtaining an estimate of q allows an updated intermediate compression ratio r to be found by dividing the size of the original image by the size of the image compressed to the intermediate quality q.

The intermediate compression r is then compared to the desired compression, ratio. If r is less than ratio, the lowest ratio r1 is set equal to r. If q1 is equal to q, then the routine will exit the if loop, otherwise q1 will be set equal to q before another iteration is performed within the if loop. Alternatively, if r is greater than ratio, the highest ratio r0 is set equal to r. If q0 is equal to q, then the routine will exit the if loop, otherwise q0 will be set equal to q before another iteration is performed within the if loop. It will be understood that this loop provides an iterative process where the changing integer values of q1 and q0 will converge upon the intermediate value of q. In fact, it can be derived mathematically that the bisection iterative process will take at most $[\log_2(95-5)]=7$ iterative steps to converge.

The point of convergence will provide a quality value integer q which produces the compression value r closest to the desired compression value, ratio. It should be noted that after each iteration, the variable duration is recalculated by subtracting the start variable from the finish variable and dividing by the clock frequency (i.e. CLOCKS_PER_SEC). If the duration of the iterative process exceeds maxtime, the iterative loop will be exited with the best compression ratio r and quality q estimates found up to this point in the program's execution.

Once the iterative loop is exited, the last intermediate quality value q will be passed to the standard JPEG Compress function. This value of q will be used to compress the input image and the size of the input image will be returned to the main function RTCompess. In this manner, the function RTCompress determines the size of an input image compressed to a desired compression value, ratio.

This version of CompressRT just described uses the entire image to estimate a compression quality sufficient to achieve the desired compression ratio. This is practical when the estimation process on local computer (i.e. server) can be run fast enough not to interfere with other operations (such as transferring images across a network). If greater computational speed is required, then a smaller sub-sample of the original image may be used to estimate the ratio and quality with CompressRT, and then the estimated quality value may be used to compress the original, full-sized image.

The following example illustrates how this sub-sample method reduces computational time. In the above code, each step requires one Compress( ) call to update the current estimated compression ratio r, and two more calls are made with q0=5 and q1=95 quality values before the iterations start. That means that with the worst case scenario (using the bisection estimate method), CompressRT( ) will take approximately 7+1+1=9 times longer to execute compared to standard JPEG Compress( ). When network bandwidth is low, this computational time overhead will have negligible effect on the total image download time. However, where bandwidth is high and download time comparatively fast, the computational overhead may be reduced by using a smaller image sub-sample to estimate the ratio in CompressRT( ). One suitable technique is to use the central part of the original image, with $\frac{1}{7}$ of the original image size in each dimension. In this case, the number of pixels in this sample will be $\frac{1}{7}*\frac{1}{7}=\frac{1}{49}$ of that of the original image size. Since JPEG compression complexity is proportional to the number of pixels operated upon, 9 iterations for $\frac{1}{49}$ of the original data will take $9*(\frac{1}{49})=0.18$—reducing time overhead to at most only 18% of the full image JPEG compression time.

Dynamic DICOM Image Compression. Another embodiment of the present invention provides a method of adjustably compressing data in response to the available network bandwidth. This method will be referred to herein as "dynamic compression". Dynamic image compression can be implemented on top of the DICOM standard as a set of classes/services fully compliant with DICOM object-oriented design. Where appropriate, the terminology used in the following description is a part of the DICOM standard. The definitions of dynamic DICOM compression classes are presented in C++ object-oriented syntax and the functional interface of these classes is illustrated in the pseudocode reference in connection therewith.

1) DICOMObject Class

The DICOMObject class represents a DICOM Data Set defined in the part PS3.5, Section 7 of the DICOM standard. The DICOMObject class will support the following functions which are utilized in the dynamic compression program of the present invention:

int—GetSize( )—This function returns the size of a DICOM object in bytes. The returned size is defined as the total size of all DICOM data element values and data element tags, as specified in part PS3.5 of the DICOM standard.

int Compress(bool lossless, double ratio, double maxtime=1000000)—JPEG-compresses the image data inside the DICOM object. If the lossless parameter is set to true, then either the improved lossless compression described above may be used or_standard lossless JPEG compression may be used (DICOM PS3.5, Section 8.2.1), and the ratio parameter is ignored. If the lossless parameter is set to false, then lossy JPEG compression is used (also DICOM PS3.5, Section 8.2.1) as described above with the novel CompressRT( ) method. The ratio parameter will define the required compression ratio, which should be greater than 1.0. Moreover, the third parameter, maxtime, can also be used from the described CompressRT( ) implementation if limiting compression time of a specific duration is desired. In such a case, the compression ratio would be the ratio achieved at the expiration of maxtime. The Compress(bool lossless, double ratio, double maxtime) function returns a positive integer number, which is the new size of the DICOM Object after its image part is compressed as specified. This new size is approximately equal to the original data size divided by ratio. The method returns −1 if JPEG compression fails for any reason.

2) ApplicationEntity Class

This class implements a DICOM "application entity", as described in DICOM PS3.7. An application entity is any device within the network (e.g. PC, printer, disk storage etc.) which can be involved in a DICOM image exchange. An instance of the ApplicationEntity class is primarily defined by its internet protocol (IP) address and port (socket) number, at which the DICOM networking occurs; this data is stored in the class' private variables. The ApplicationEntity class must also implement the following functions:

bool CanAcceptCompressed( )—This function returns true if this application entity can accept JPEG-compressed images. This is equivalent to supporting the "1.2.840.10008.1.2.4.50"–"1.2.840.10008.1.2.4.66" and "1.2.840.10008.1.2.4.70" DICOM unique identifiers as set out in part PS3.6, Annex A of the DICOM standard. If CanAcceptCompressed( ) returns false, only uncompressed data can be sent to this application entity.

bool CanAcceptLossy( )—Provided that JPEG compression is permitted (i.e. CanAcceptCompressed( ) returns true), this function verifies whether lossy JPEG compression is permitted at this application entity. The return value of true means that images with lossy JPEG compression may be accepted, which is equivalent to supporting the "1.2.840.10008.1.2.4.50"–"1.2.840.10008.1.2.4.56" and "1.2.840.10008.1.2.4.59"–"1.2.840.10008.1.2.4.64" DICOM unique identifiers (part PS3.6, Annex A of the DICOM standard). The return value of false indicates that that only the images with lossless JPEG compression are accepted, which is equivalent to supporting the unique identifiers "1.2.840.10008.1.2.4.57", "1.2.840.10008.1.2.4.58", "1.2.840.10008.1.2.4.65", "1.2.840.10008.1.2.4.66" and "1.2.840.10008.1.2.4.70".

void SetCurrentBandwidth(double bwidth)—This function writes the bandwidth value, bwidth, to the corresponding private member of the ApplicationEntity class (with units of bytes/second). This function has no influence on the actual network bandwidth; rather, it simply records that the bandwidth was found to be equal to bwidth, and stores this value into a private variable of the ApplicationEntity class.

double GetCurrentBandwidth( )—This function returns the network bandwidth bwidth, associated with the application entity, and which was previously recorded with the SetCurrentBandwidth( ) function. If no bandwidth value was previously recorded, the function returns −1.

void SetMaximumCompressionRatio(bool lossless, double ratio)—This function records the compression type and maximum compression ratio that is acceptable at the application entity. The lossless=true type indicates that only images compressed with a lossless algorithm can be sent to this application entity, and in this case the ratio parameter is ignored. The lossless=false type indicates that the application entity can accept lossy image compression, with the maximum compression ratio being equal to ratio. Whether the application entity accepts compression and to what ratio compression is accepted, may depend on the use of the application entity. For example, if the application entity is a computer and monitor from which physicians will view the image for diagnosis purposes, it will not be acceptable to lose significant amounts of information in the transmitted image. Therefore, no compression may be allowed or only a limited degree of compression allowed.

double GetMaximumCompressionRatio( )—This function returns the maximum image compression ratio, ratio, accepted at the application entity and which was previously recorded with the SetMaximumCompressionRatio( ) function.

void SetDownloadTime(int time)—This function sets the maximum download time (in seconds) in which the application entity is required to receive any DICOM object over the network. This is a download time constraint which will be set for each application entity by an operator (e.g. the network administrator) and will act as a "real-time" network requirement imposed on these particular application entities.

int GetDownloadTime( )—This function returns the maximum object download time previously set SetRequiredTime( ).

An alternative way to control real-time networking would be specifying download time per information unit size (i.e., sec/Kbytes), which is equivalent to specifying desired network bandwidth. The choice between time and time per size will depend on specific application needs.

3) ApplicationEntityArray Class

This class may be defined as an array of ApplicationEntity instances: ApplicationEntity[MAX_AENUM], where MAX_AENUM is a constant specifying the maximum number of application entities possible on the given DICOM network (i.e., the total number of PCs, printers etc. at the current installation site). It also may implement the following methods:

void SetCurrentEntity(int index)—This function sets the current remote network application entity to entity number index. From the moment this function is called, all images and data will be sent from the local archive to the particular entity identified by index. This will continue to be the case until SetCurrentEntity is called again for a different application entity.

Application Entity GetCurrentEntity( )—returns the current remote application entity to which data is presently sent over the DICOM network.

4) PDU Class

This class implements the DICOM Protocol Data Unit (PDU), as described in the PS3.8 part of the DICOM standard. The PDU class establishes the network connection parameters (e.g. packet headers, portion of network band over which image is sent, and data modality—e.g. CT, MRI, Ultra Sound) between the server and the application entity receiving the object or image being transmitted. As a part of this standard DICOM implementation, the class must include the following function:

bool Send(DICOMObject& d, ApplicationEntity& ae)—sends DICOM object d to application entity ae over DICOM network, as specified in DICOM PS3.5–PS3.8. This function returns true if the object successfully sent and false otherwise.

5) NetworkTimer Class

The NetworkTimer class is responsible for timing current network performance. It implements the following functions:

void Startimer( )—starts network timer for the current DICOM network connection.

double EndTimer( )—stops network timer for the current DICOM network connection.

These two functions, as well as the timer itself, can be implemented based on C time-processing functions such as localtime( ) and ctime( ), which are well known in the art. Because network bandwidths will vary over time due to use conditions and other factors, it is necessary to periodically update the current bandwidth measurement. To compute the current network bandwidth, the following functions are used:

int GetDataSize(DICOMObject& d)—This function takes a reference to any DICOM object d (i.e. an image) to be sent over the network, and computes the object's size in bytes. This size is computed with d. GetSize( ) function previously defined as part of the DICOMObject class.

void EstimateCurrentBandwidth(ApplicationEntity& ae)—This function updates the current bandwidth value for the application entity ae based on observed network performance. The current bandwidth bwidth is computed by dividing the size, provided by the last call of GetDataSize( ) function, by time elapsed from the last call of the StartTimer( ) function (the time elapsed can be found inside the EstimateCurrentBandwidth( ) function by calling the EndTimer( ) function). Once bwidth is computed, this value is passed to the application entity variable ae with a call to the function ae.SetCurrentBandwidth(bwidth).

Once the above classes and functions are established, it is possible to implement a program which will accept and maintain a maximum allowable time for downloading an image over a network. The program will monitor the bandwidth or all application entities in that network; and then when an application entity requests an image, to compress the image to the degree necessary for the application entity to download the image in less than the maximum allowable time. Such a program may be illustrated with the following segment of pseudo code seen in FIGS. 4—6 and written in C++ syntax. It will be understood that language following the "//" notation are comments. The current network bandwidth for all application entities may be monitored with the pseudo code seen in FIG. 4.

It can be seen in this code how ApplicationEntity ae=ael.GetCurrentEntity( ) identifies to which application entity an image is to be transmitted over the network. A PDU connection is then created between the server and the application entity. Next, from the NetworkTimer, the function GetDataSize(d) instructs the timer to prepare timing the network transmission of d.GetSize( ) bytes. Then the StartTimer( ) function will initiate the clock sequence. The PDU class function Send(d,ae) will transmit object d to the application entity ae. When the object has been downloaded by the application entity, the EstimateCurrentBandwidth( ) function will stop the clock sequence (with EndTimer( ) call). It will be readily apparent that the function EstimateCurrentBand(ae) may calculate the current bandwidth in bytes/sec. by dividing the size of the image by the time elapsed during transmission of the image. This measure of bandwidth will be made each time an object is transmitted to an application entity, thereby allowing a recent bandwidth measurement to be used when determining the compression ratio of the next object to be transmitted to that application entity. The pseudo code segment of FIG. 5 illustrates this procedure.

The code seen in FIG. 5 will determine if compression is necessary and allowable and if so, to what degree compression should be carried out. The function GetSize( ) determines the size of the object d and assigns the size value to the variable dsize. The maximum allowable download time for the application entity ae is retrieved with GetDownloadTime( ) and assigned to the variable ntime. A variable representing the time needed to download the object d with the current bandwidth, ctime, is assigned the value obtained by dividing the object size dsize by the current bandwidth for application ae (returned by ae.GetCurrentBandwidth). If the condition if(ctime>ntime) is false, then the objected is transmitted with no compression. If the condition is true, the program first determines whether the application entity ae accepts lossy compression (ae.CanAcceptLossy( )). If this condition is true, the lossy compression ratio will be determined by selecting the lesser (using the standard C function min( )) of ctime divided by ntime or the maximum allowable compression ration for that application entity (ae.GetMaximumCompressionRatio( )). The object will be compressed to the degree of ratio. If the application entity does not accept lossy compression but does accept lossless compression, lossless compression will be applied to the object. If the application entity does not accept any type of compression, the object will be transmitted over the network in an uncompressed format, even if the object may not be downloaded within the desired time constraints.

From the above disclosure, it will be readily apparent that this embodiment of the present invention provides a method of adjusting the compression ratio of image data based upon the available bandwidth of a network across which the image is transmitted.

The invention also encompasses an alternative method for implementing the time functions StartTimer( ) and EndTimer( ). Above, the standard C localtime( ) and ctime( ) functions were utilized, but these functions only measure time as an integer (i.e. as a whole second). An alternative implementation, which would measure time within fractions of a second, is possible with Windows API. The class is designated AccurateTimer and is illustrated with the pseudo code seen in FIG. 6. However, it is noted that the AccurateTimer class is known in the prior art and is shown here as an example, and not as part of the present invention.

Sound Encoding. The present invention further includes a method of encapsulating audio data in a DICOM object such as an image. This is accomplished by creating a SoundRecorder object which performs sound recording and playback. The sound is captured and played by the sound recording hardware, including PC sound card, microphone and speakers. When the sound is recorded, it is sampled to the optimal digital frequency chosen by the recording clinician. The following methods must be implemented:

bool Record(int sf, bool stereo, int max_time=300, int max_size=1000000, int format=WAV).

This function records sound input with the following specified digital sampling parameters:
sf—Sampling Frequency, KHz
stereo—Stereo (yes or no)
max_time—Maximum recording time in seconds
max_size—Maximum record size in bytes
format—Digital sound format.

This sound-recording function may be implemented based on many conventional operating system sound interface supports well known in the art. For instance, Windows implementation for basic sound recording would appear as seen in FIG. 7. Playing back the recorded sounds may readily be accomplished by a function such as:

bool Playback(int from, int to)—play back recorded sound, from a first time from to second time to. In other words, the function parameters are:
from—Playback start position
to—Playback end position.

For instance, on a Windows platform, a simple playback implementation may be accomplished using the standard Windows PlaySound( ) function.

SoundRecoder Object.

After the sound has been recorded, it may be advantageous to convert the sound into a different format (for instance, from WAV to MP3 format). For example, conversion from WAV to MP3 format may reduce the size of sound data by a factor of approximately 10 without any perceivable loss of quality. This conversion may be made (after the sound is recorded) with an appropriate codec (e.g., an MP3 encoder), incorporated into the below described SoundRecoder object.

This object encodes/decodes digitized sound in the well-known MP3 format. For encoding process, the original digitized sound is received as SoundRecorder object output after recording. For decoding process, the sound is converted back from MP3 to the digital format accepted by SoundRecorder (for instance, WAV format on Windows platform), and is played back. Therefore, the following functionality must be implemented:

BYTE* GetSound( )—returns the pointer to the current sound (stored as a BYTE buffer).

int GetFormat( )—returns the current sound format (WAV, MP3, etc.)

bool Insert(DICOMObject& dob)—insert this sound into DICOM Data Set. The return value of true confirms successful insertion, and false corresponds to failed insertion. The implementer will have to specify a 4 byte group/element tag number (PS3.5 part of DICOM standard) to identify the sound entry in his DICOM dictionary—since there is no sound entry in the standard DICOM dictionary.

bool Encode(BYTE* input, int inputFormat, BYTE* output)—this function takes a byte stream input, which represents a digitized sound in inputFormat format (such as WAV), and encodes it into MP3 stream output. The function returns true if encoding process was successful, and false otherwise.

bool Decode(BYTE* input, int outputFormat, BYTE* output)—opposite to Encode, decodes MP3 stream input into output stream output with outputFormat format. The SoundRecoder::Insert( ) function is implemented as seen in FIG. 8.

It may also be desirable at some point in time to remove a previously inserted sound from an object. This removal may be accomplished with the following function:

bool Extract(DICOMObject& dob, bool remove)—extract digitized sound buffer from DICOM Data Set dob. If the remove parameter is set to true, the sound is removed from dob after it is extracted; otherwise, an original copy of the sound buffer will remain in dob.

Thus, with the above described code, audio data may be encapsulated into a DICOM object such as a patient study, the data converted to more compact formats, and if desired, the audio data may also be removed.

Integer-Based Ray Tracing

Ray tracing or ray casting is a well known technique for using three-dimensional (3-D) image data to draw a 3-D appearing object on a two dimensional (2-D) imaging device (e.g. the screen of a computer monitor). To give the object displayed on the 2-D screen the appearance of depth, different areas of the object must be shaded. Ray tracing uses information from the 3-D data to determine what areas of the object on a 2-D screen should be shaded and to what degree the areas should be shaded. Such prior art methods of Ray Tracing are set out in *Radiosity and Realistic Image Synthesis*, Cohen and Wallis, Academic Press, Inc., 1993, which is incorporated by reference herein.

One typical example of a 3-D data set could be a series of CT scan images as suggested in FIG. 9. Each of the three images in FIG. 9 represents a "slice" taken at a certain level of a human head. A complete series of CT scan images for a human head may comprise 100 to 200 such slices. It will be understood that each slice provides information in two dimensions, for example the x-y plane. By supplying multiple slices, the series of CT scans in effect provide information in the third dimension or the z direction. Different tissues on the CT image are represented by different color and/or intensity (i.e. brightness). For every position (x, y, z) in the 3-D image data, there is a corresponding intensity value (L). Thus, the 3-D image data may be represented by the equation F(x, y, z)=L(x, y, z). When it is desired to view a certain tissue type or object of interest (e.g. a suspected tumor) corresponding to a constant intensity of L in the CT image, this may be accomplished by identifying all (x, y, z) points in the 3-D data where F(x, y, z)=L.

Figure 10:
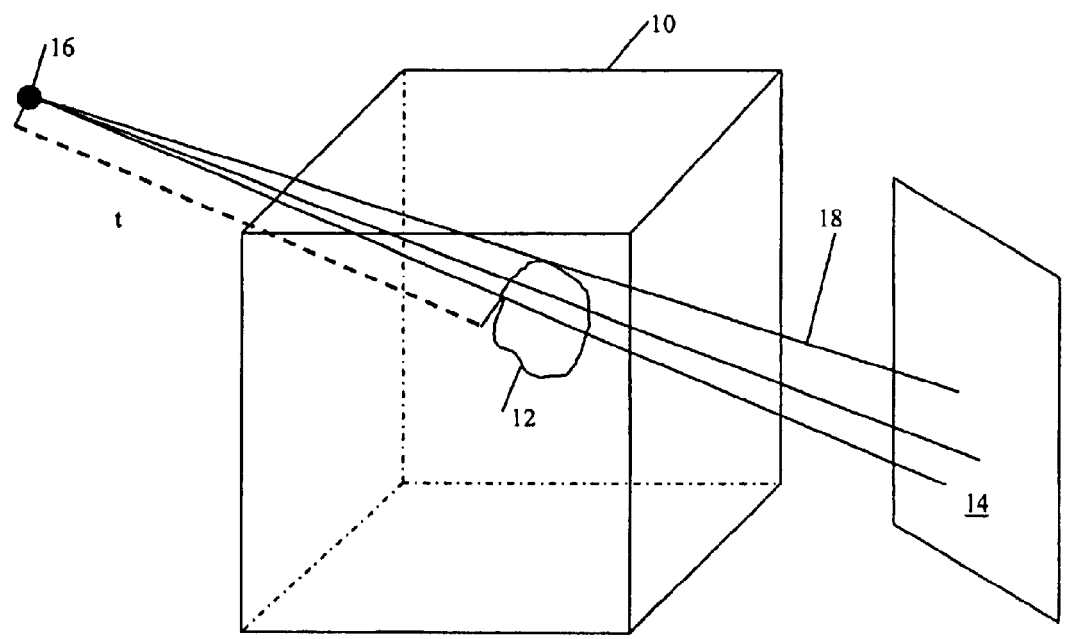
FIG. 10 is a schematic representation of prior art ray tracing methods.

FIG. 10 schematically illustrates a 3-D data set 10 having an object of interest 12 ("object 12") located within 3-D data set 10. A 2-D image plane 14 is shown with several lines of sight or "rays" 18 extending between 2-D image plane 14 and observer position 16, while also passing through 3-D data set 10. While not shown, it is presumed for the purposes of this explanation that the light source is directly behind observer position 16. A ray 18 will be back projected from the picture elements or pixels on 2-D image plane 14 to observer position 16. While this process of "ray generation" could be performed for each pixel on 2-D image plane 14, it is generally sufficient to generate rays from every nth pixel (e.g. every third or fourth pixel) in order to save computational time. Where a ray 18 (viewed from observer position 16) intersects object 12, it is known that the corresponding pixel on the 2-D image plane 14 will have an intensity value related to the brightness or shading of object 12 as seen from observer position 16. Pixels associated with those rays 18 not intersecting object 12 will have predetermined background intensity, such as zero representing a completely black pixel.

To determine the proper shading of those pixels on 2-D image plane 14 associated with object 12, it must be determined what the angle of the surface of object 12 is relative to the ray 18 impacting object 12 at that point. As noted above, the light source is presumed to be directly behind observer position 16. Thus, if the surface of object 12 at the point of ray impact is normal to that ray (and thus observer position 16), then the maximum light will be reflected back from that point to observer position 16. The pixel on 2-D image plane 14 corresponding to that ray 18 will consequently be assigned the highest intensity value. On the other hand, if the surface at a point of impact of a ray 18 is parallel to that ray, then virtually no light will be reflected and the pixel associated with that ray 18 will have very low intensity value.

Figure 11:
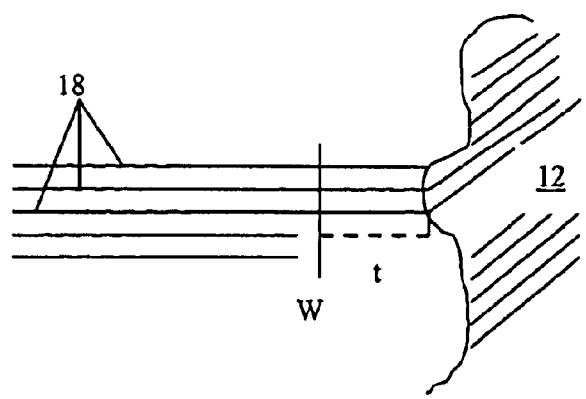
FIG. 11 is a detail of multiple rays striking the surface of an object of interest.

To determine the surface angle at a point of impact, it is necessary to determine the distance "t" from the surface of the object to observer position 16 (or another point along the ray 18) and compare that to the same distance for adjacent points of impact. FIG. 11 illustrates an enlarged section of object 12 with several rays 18 impacting its surface. The length t for each ray is shown as taken from an arbitrary point W along the rays 18. It is irrelevant whether point W is observer position 16 or a point much closer to object 12. It is only necessary that point W be displaced from the surface of object 12 such that it is possible to measure the relative distances between point W and the point of impact for neighboring ray 18. This method of determining where along ray 18 object 12 is encounter (i.e. the length of t) is a form of data volume traversal and is described further below.

Figure 12:
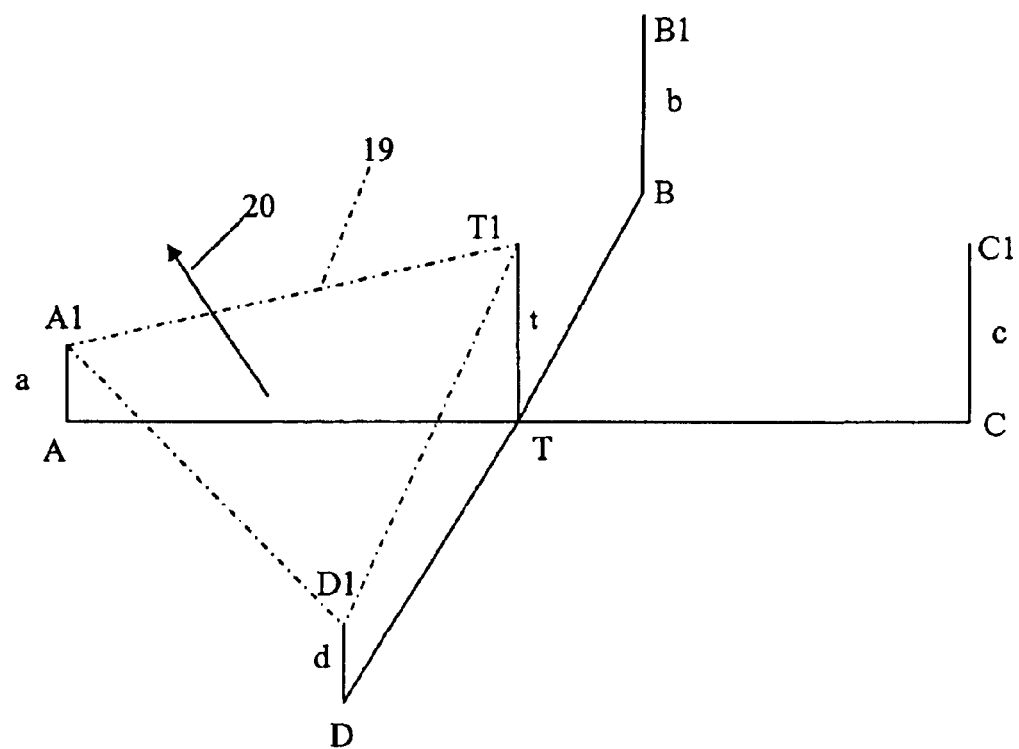
FIG. 12 is an graphical illustration of a prior art method used to determine the surface angle orientation of the object of interest at the point of ray impact.

Once t is determined for a ray 18 and several neighboring rays, it is possible to determine the surface angle at ray 18's point of impact. FIG. 12 is a graphical representation illustrating how the surface angle of a point of impact T will be calculated using the relative distance between observer position and points of impact T, A, B, C, and D. Points A, B, C, and D are points of impact neighboring point T. Points A, B, C, and D have relative distances to the observer position of a, b, c, and d respectively. T1, A1, B1, C1, and D1 are points at distances t, a, b, c, and d respectively above the surface of object 12. It can be seen that points T1, A1, and D1 form a triangular plane (shown in dashed lines) and this triangular plane has a vector 20 which is normal to the surface of the triangular plane. While not shown in FIG. 12 in order to maintain simplicity, it will be understood that similar triangular planes and normal vectors 20 will be computed for triangles T1 A1 B1, T1 B1 C1, and T1 C1 D1. The normal at point T is then approximated as the average normal of the four normal vectors 20. The estimated normal vector at T will be the vector {(a−c)/2, (d−b)/2, t}. It is this normal vector at point T, which is considered the normal to the surface angle at the point of impact.

As alluded to above, the intensity of a pixel on the 2-D image plane is determined by that pixel's associate ray 18 and the surface angle on the object relative to that ray 18. In other words, the intensity of a pixel will be related to the angle between the associated ray 18 and the normal vector at the point of impact. If the ray 18 and normal vector are parallel, the surface directly faces the observer point (and light source) and the point of impact reflects maximum light (i.e. the pixel is assigned a high intensity value). If the ray 18 and normal vector or perpendicular, the point of impact reflects very little or no light and the associated pixel is assigned a low intensity value. When the angle ($\alpha$) between ray 18 and the normal vector is between 0° and 90°, the intensity is determined as the maximum intensity multiplied by cosine $\alpha$.

The two main components of the above described prior art method of ray tracing (ray generation and volume traversal) are computationally very demanding and often require excessive amounts of computer processing time. With ray generation, each ray must be defined by a set of equations such as:

$$xray = a + t*l1$$

$$yray = b + t*l2$$

$$zray = c + t*l3$$

where xray, yray, zray are the components of a ray 18 (such as to the point of impact), a, b, c are the coordinates of the observer position, t is the relative distance (i.e. xray, yray zray to the point of impact), and l1, l2, l3 are values representing the direction of ray 18. Generally, these numbers will be large floating point values and considering a ray is generated for large number of pixels, the size of the numbers will greatly add to the processing time required to ray trace an image.

Figure 13:
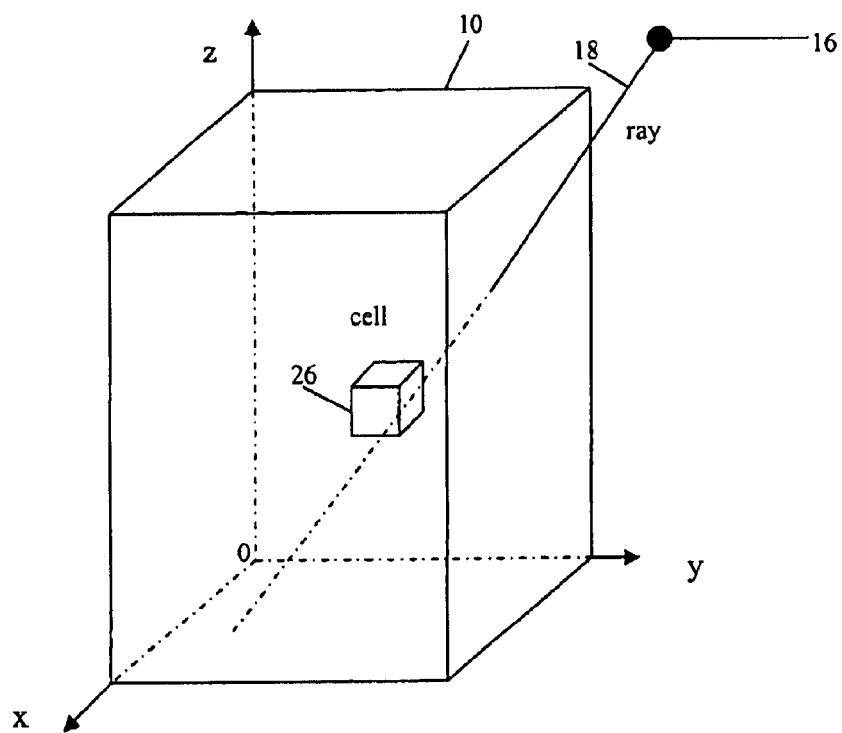
FIG. 13($a$) is a graphical representation of a three-dimensional data set being traversed by a ray.
Figure 13:
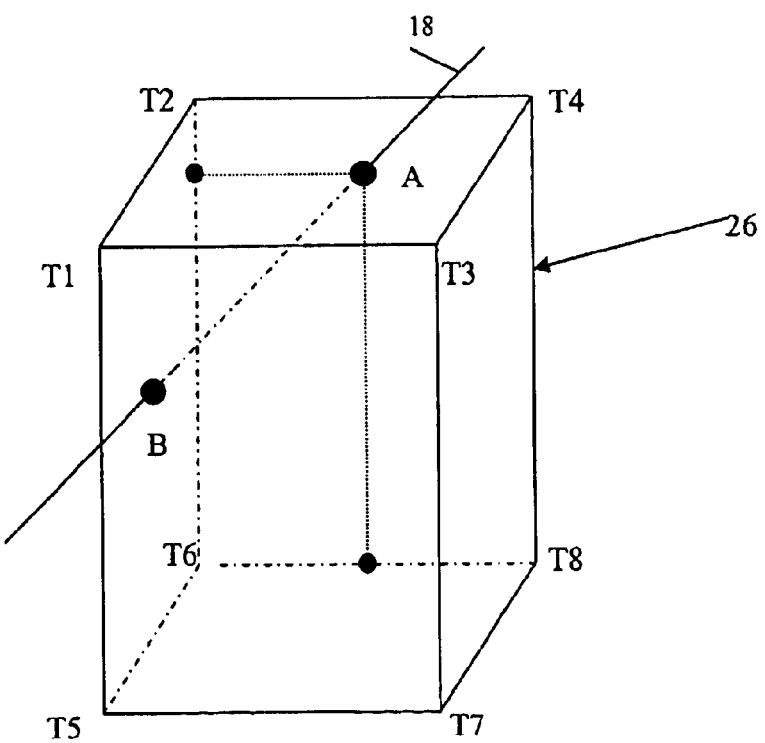

When finding the distance "t" from the surface of object 12 to observer position 16 as described above, prior art ray tracing techniques typically use a form of volume traversal. As illustrated conceptually in FIG. 13(a), a 3-D data set 10 is provided with a ray 18 beginning at observer point (plane) 16 and extending through data set 10. Data set 10 may be viewed as being sub-divided into a series of cells 26. FIG. 13(b) illustrates how each cell 26 will be formed from a 8 points T1–T8. It will be understood that each point T1–T8 is a known data point. For example, referring back to FIG. 9, T1–T4 would be adjacent pixels on one CT image or slice and T5–T8 would be the same pixels on an adjacent slice. In the volume traversal method, each cell 26 which is intersected by ray 18 must be analyzed. It must first be determined whether a cell 26 contains any portion of the object of interest. If so, and if further the ray 18 actually intersects the object within the cell, then it must be determined exactly where along the length of ray 18 (within cell 26) that the object is intersected. This point of intersection provides the length "t". Of course, if the cell 26 does not contain part of object 12, then the next cell along ray 18 is analyzed and this process is continued for all cells 26 (along ray 18) until object 12 is encountered or ray 18 exits 3-D data set 10. It will be apparent that carrying out this data volume traversal for many thousands of rays is a computationally expensive procedure, particularly when carried out with floating point values as practiced in the prior art.

The prior art has made attempts to reduce the processing time expended on ray generation and data volume traversal. One alternative developed is to project rays from every nth pixel (say every 3rd, 4th or 5th pixel) rather than every pixel. Once a determination of the intensity of every nth pixel is made, an interpolation may be made for the values between every nth pixel. Naturally, the larger the value of n is, the more error possibly introduced into the final image. Additionally, the various methods of interpolation have their own disadvantages. Two manners of interpolation known in the art are Gouraud's linear interpolation and complex Fong interpolation. However, Gouraud interpolation produces artifacts on the square boundaries. While complex Fong interpolation provides more accurate results, its complexity expends much of the computation savings gained by choosing every nth pixel. Moreover, even when generating rays only for every nth pixel, it is still necessary to generate many thousands of rays to accurately portray an image.

Figure 14:
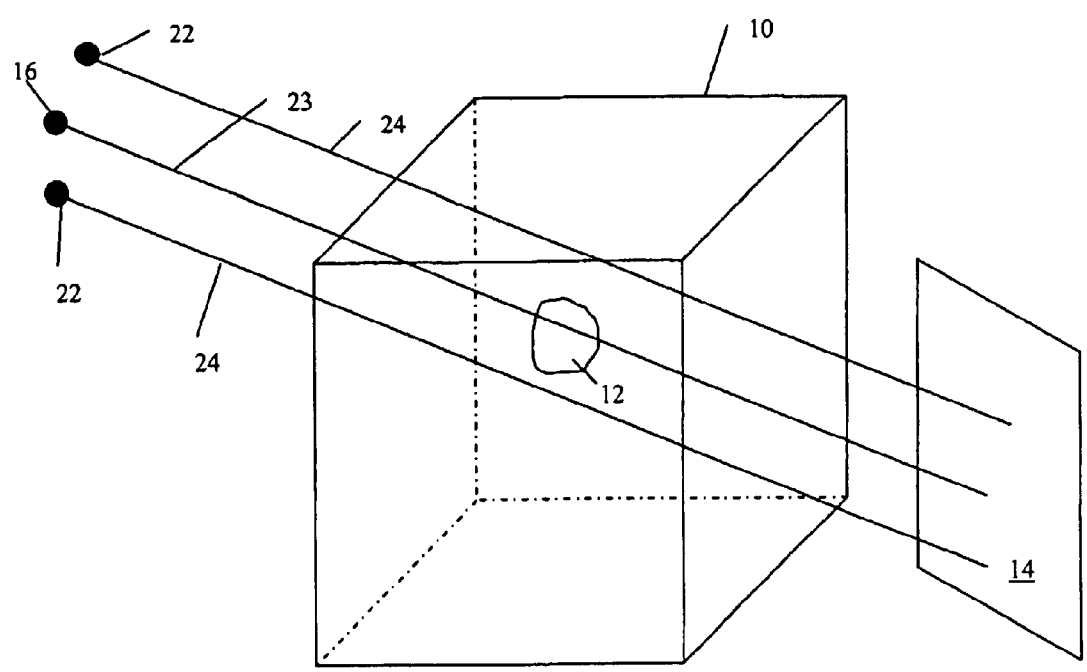
FIG. 14 is a graphical illustration of the ray tracing method of the present invention.

The present invention provides a much more computationally efficient method of ray tracing than hereto known in the art. This method effectively replaces the large floating point numbers with integers, allowing all calculations to be integer based and therefore much faster. FIG. 14 illustrates another example of a 3-D data set 10 having an object of interest 12 and a 2-D image plane 14 conceptually positioned behind 3-D data set 10. However, FIG. 13 differs from the previous example illustrated by FIG. 10 in that there are not multiple rays from observer position 16 to each pixel on 2-D image plane 14. Rather, there is a single observer ray 23 which extends from image plane 14 to observer position 16. As in the example above, observer ray 23 may be defined by the equations:

$xray = a + t*l1$ $yray = b + t*l2$ $zray = c + t*l3.$

Now however, for purposes explained below, xray will be set equal to i, resulting in the set of equations:

$xray = i$ $yray = b + (i-a)*l2/l1$  Equation (4)

$zray = c + (i-a)*l3/l1$

Next, the values a, b, c, together with the ratios l2/l1 and l3/l1 will be converted to rational numbers (i.e. numbers which are a ratio of two integers) which closely approximate the original floating point values. By changing the values a, b, c, together with the ratios l2/l1 and l3/l1 to rational numbers, the computational expense of operating upon floating point numbers may be eliminated. While this will slightly change the observer position and ray angle represented by the values l1, l2, l3, the changes are far too small to adversely affect the final results of the ray tracing. For example, a floating point value of a=2.3759507 . . . could be represented by the rational number 2.37 (i.e. the ratio of the integers 237 and 100). Because the substituted rational numbers are such close approximations to the original floating point values, the change in observer position cannot be noticed by a user and the ray angle still allows the rays to impact the same pixel on the 2-D image plane.

As additional rays are back projected from image plane 14, the method of the present invention does not converge these rays on observer point 16. Rather these rays 24 travel parallel to observer ray 23 (i.e., have the same values for l1, l2, and l3). These parallel rays 24 will extend to origin points 22 in the same plane in which observer point 16 lies and which is perpendicular to rays 24. Like observer point 16, each origin point 22 will have it's a, b, c coordinates adjusted to integer values. This process is repeated for all other pixels on image plane 14 from which rays 24 will be back propagated.

The main practical outcome of this method of substituting rational values for floating point values is that it allows using only integer additions for ray generation and data volume traversal. This process is described by equation (4), where fractions like l2/l1, l3/l1 or l2/l3 were assumed to be rational. This is identical to considering l1, l2 and l3 as integers, since in the case of using rational numbers, both sides of the equation (4) can be multiplied by the least common denominator of l1, l2 and l3, which will eliminate any fractional parts. Note that numbers l1, l2 and l3 are constants, and so is their common denominator, therefore the conversion from rational to integer is carried out only once, and does not need to be recalculated for each particular ray.

Figure 15:
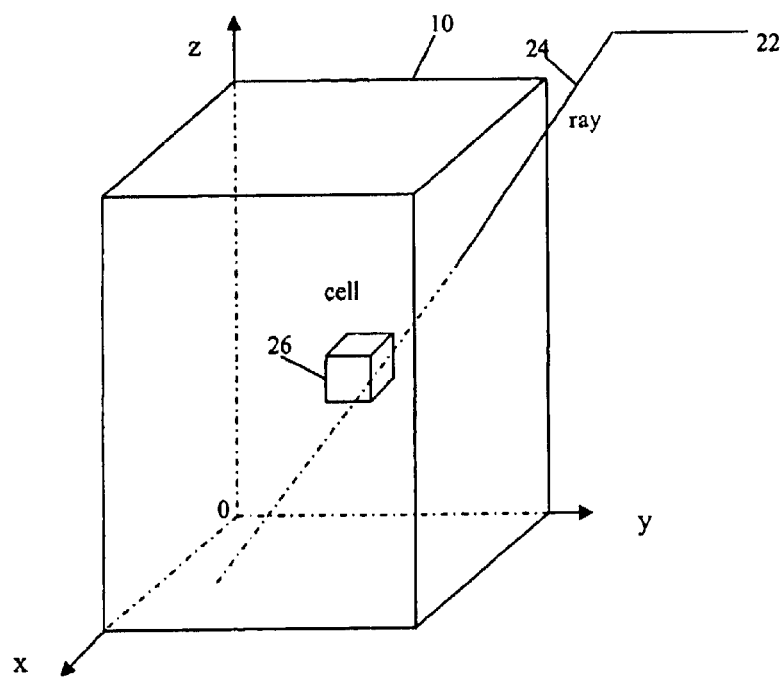
FIG. 15($a$) is a graphical representation of a three-dimensional data set being traversed by a ray in the method of the present invention.
Figure 15:
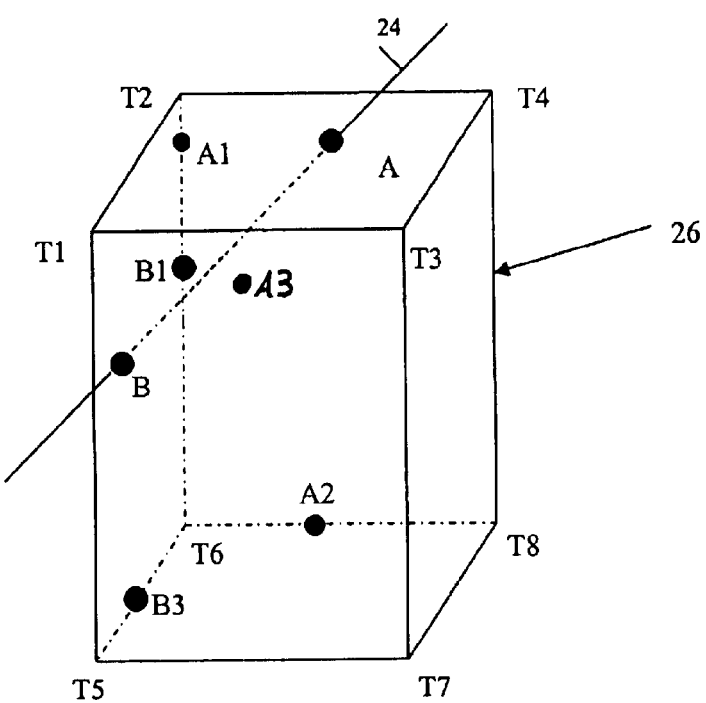

FIG. 15(a) shows with a 3-D data set 10 and an individual cell 26 within data set 10. As with FIG. 14(b), FIG. 15(b) shows an enlarged view of cell 26 with corners T1–T8 representing known data points. It will be understood that the component of a ray 24 along the x-axis (i.e. the xray value from Equantion (4)) will be set equal to xray=i. Equation (4) is written for the case where xray=i results in the ray intersecting the side of cell 26 closest to origin 22. In FIG. 15(b), point A illustrates the point where ray 24 intersects this side of cell 26 upon entry of cell 26 and point B illustrates the cell side where ray 24 exits cell 26. It will be understood that because equation (4) is composed of rational numbers, the position of points A and B must also be rational numbers with the same denominator, which also permits consideration of all these numbers as integers.

The fact that rays produced by equation (4) are traced through to a point located on a ell side has its own benefit of minimizing the complexity of linear interpolation. If, for instance, the point A was not located on a cell side, one would have to use all 8 cube vertices T1–T8 for linear volume interpolation of F(A). But when A is a side point we use only two-dimensional linear interpolation of F(A) involving 4 points T1–T4 that cuts calculation cost and time by more than twice. Because the function F(x,y,z) was chosen as integer on the integer grid points (x,y,z), its value is rational at a rational point A and has therefore the form of F(A)=F1(A)/F2(A), where integer numbers F1(A) and F2(A) can be found with integer arithmetic directly from the linear interpolation formula.

The location of each point A on a cell is defined by three distances AA1, AA2 and AA3, measured from A to the closest cell side in the y, z and x dimension respectively. Because A resides on a cell side, at least one of these coordinates (e.g., AA3 on the opposite cell wall) is equal to the cell size in this dimension. The size of the cell in all dimensions is an integer value. The remaining coordinates (AA1 and AA2) are integers as well. When the ray point A needs to be traced to the next position B, it's equivalent to solving Equation (4) for another integer point (B1,B2,B3)= (xray,yray,zray), which also implies that (B1,B2,B3) is obtained as an integer offset of (A1,A2,A3). Thus, ray tracing becomes a purely integer based calculation, and volume traversal is reduced to simple and time-efficient integer subtraction.

Figure 16:
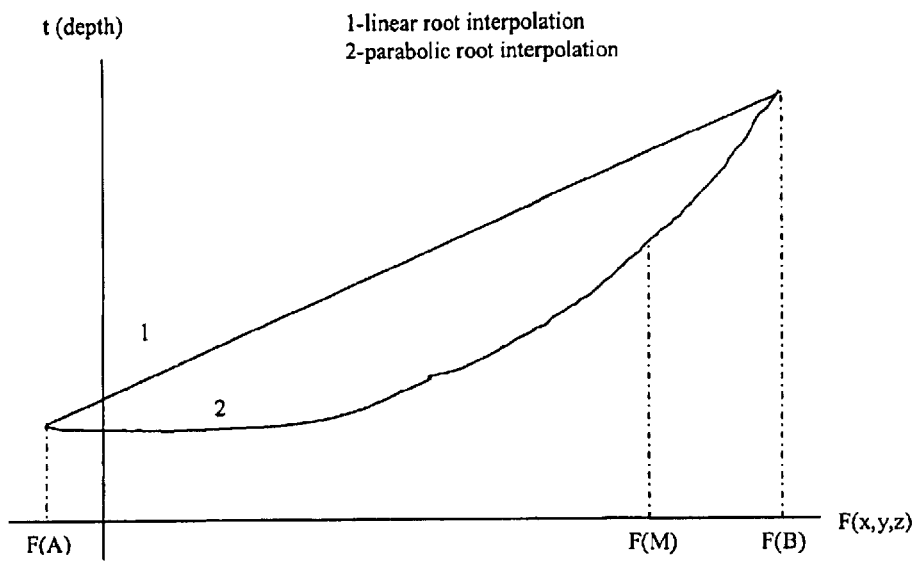
FIG. 16 is a graphical illustration of the parabolic interpolation method of the present invention.

The next step is the computation of ray intersections with the surface F(x,y,z)=L (the intensity value of the object of interest). For this equation and linear interpolation properties, a cell 26 will contain an intersection point if and only if some of F(T1), . . . , F(T8) have different values greater than or less than L. In other words, if F(T1), . . . , F(T8) are all values either greater than L or less than L, it will be presumed that the cell does not contain a point having a value of L. This simple criterion is used to efficiently reject the cells with no intersections. Once some of F(T1), . . . , F(T8) have different values greater and less than L, an intersection point has to be inside the cell, and may be on the [AB] segment. In this case, the values of F(A) and F(B) are also computed, and compared to L. If F(A) and F(B are both smaller or both larger than L, the segment [AB] contains no intersection point, and the tracing continues to the next cell. Otherwise an intersection point belongs to [AB], and its distance from the ray origin must be computed with a proper interpolation. It will be understood that a 3-dimensional linear interpolation, used to compute F(x,y,z) at any volumetric point, taken along a ray, becomes one-dimensional cubic interpolation. Thus, the prior art method of solving for the root of F(x,y,z)=L requires the solution of a third-order equation. A typical approach taken in the prior art to reduce the complexity of this solution was to replace the cubic equation by its linear approximation. However, this approach creates visible surface distortions. The present invention utilizes a simple second-order approximation, and not to the original third-order equation, but to the formula for its root (inverse interpolation) as suggested in FIG. 16. To perform this approximation, the method must:

Compute F(M), where M is the midpoint of the segment [AB];

Consider three points (tA, F(A)), (tM, F(M)) and (tB, F(B)) and pass a parabola through them. Since all values are integers, the parabola will have rational coefficients (where tA, tM, and tB are distances to points A, M, and B respectively); and Take the lower-order (constant) term of this parabola, as the approximation to the root t0.

where r0 is the value which will represent the distance to the object surface (i.e. distance "t" discussed above. This yields the following rational root approximation formula:

$$t0 = \frac{F(M)(tA - tB) + F(A)(tB - tM) + F(B)(tA - tM)}{F(M)F(B)(F(M) - F(B)) + F(A)F(B)(F(B) - F(A)) + F(M)F(A)(F(A) - F(M))}$$

This interpolation proved to be more accurate than the linear one, but still requires only integer computations. The parabolic interpolation was found to take only 7–10% more time compared to the linear interpolation, but produces much less distortion.

Figure 17:
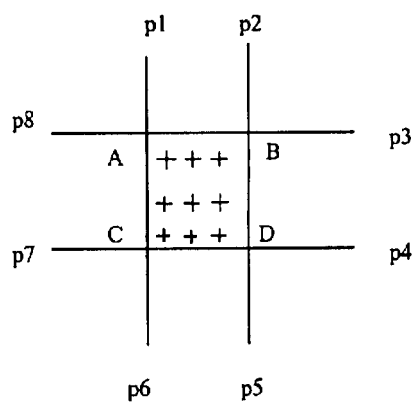
FIG. 17 is a graphical illustration of the known pixel values used to interpolate the unknown pixel values in the present invention.

As discussed above, rays need not be traced for each point, but rather may be taken at some predefined step d in each dimension, where d is optimally chosen (for example, only each d-th ray is traced in each dimension). However, rather than employing the prior art Gouraud's linear interpolation or complex Fong interpolation, the present invention uses a simple but sufficient bi-quadratic interpolation for shading or pixel intensity. FIG. 17 represents a grid of pixels where d=4 and A, B, C, D, and p1–p8 are intensity values from rays traced at every fourth pixel. The purpose of the pixel intensity interpolation is to compute the intensity for all pixels (in this case nine) inside the d×d ABCD square, which correspond to the "skipped" rays. As mentioned above, Linear Gouraud's interpolation performs this computation based only on four intensities at points A, B, C and D, thus producing well-known artifacts on the square boundaries. The present invention uses a second order 2-D approximation polynomial:

$$a_{20}x^2+a_{02}y^2+a_{11}xy+a_{10}x+a_{01}y+a_{00},$$

where the coefficients are chosen by a conventional least squares regression technique which gives the exact intensities at points A–D, and still produce the closest least-squares match to the intensity values at p1–p8. This method gives a smoother interpolation on the square boundary with marginal processing time overhead.

Figure 18:
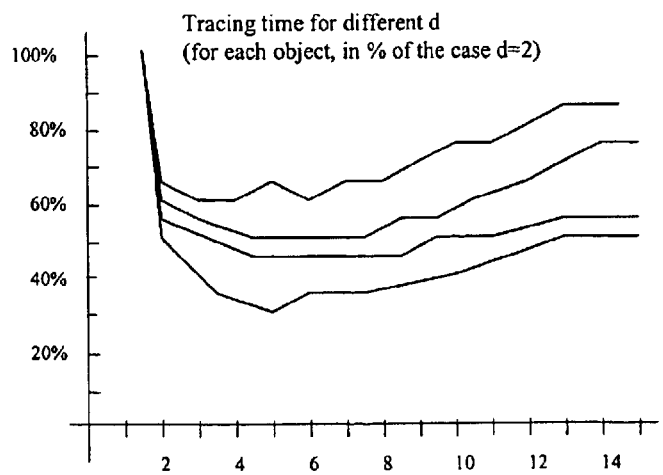
FIG. 18 is a graph illustrating an optimum step size d when using the race tracing method of the present invention.

As d is increased, tracing becomes faster (since only each d-th ray must be fired in each dimension), but parabolic intensity interpolation becomes generally slower. Experimentation was carried out with different d values from 2 to 15, observing the shading times for different test objects. The results are shown in FIG. 18. It can be seen that the most substantial time reduction occurs before d=4. Increasing d further not only starts to consume more execution time, but also produces visible image artifacts. Therefore, a step size of d=4 is believed to be most efficient both in terms of quality and speed of ray tracing. Submitted with this application is a source code listing which implements the novel ray tracing method described above.

Advanced Magnifying Glass Tool

Figure 19:
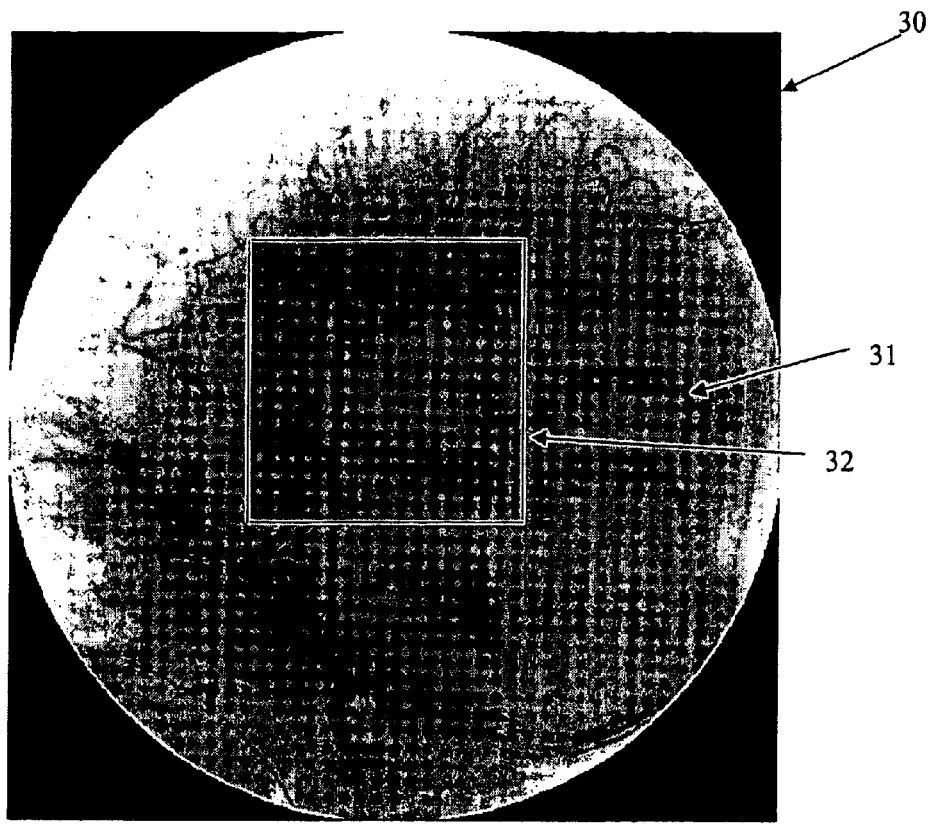
FIG. 19 is an illustration of an image on a view screen with a magnified window appearing on the screen.

Because radiological images must be so carefully scrutinized, it is common for prior art software used in viewing such images to provide a magnifying window. FIG. 19 illustrates a viewing screen 30 (such as a high resolution computer monitor) having a medical image 31 displayed thereon. A magnifying window 32 is shown displaying an enlarged portion of image 31. When in use, magnifying window 32 is typically moved with a "mouse" or similar device by conventional "click and drag" techniques. When window 32 is moved to a new position, the center of the window marks the center of original image region to be magnified. Based on the power of the magnification and the widow size, the magnifying window program computes the area of the original image to be magnified. For example, if the magnifying window is 3"×3", and the power of magnification is 2×, the region on the original image to be magnified will be 1.5"×1.5".

Figure 20:
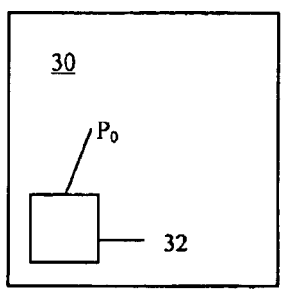
FIGS. 20($a$)–20($c$) illustrates how a prior art magnifying window proceeds through successive steps to update the window position.
Figure 20:
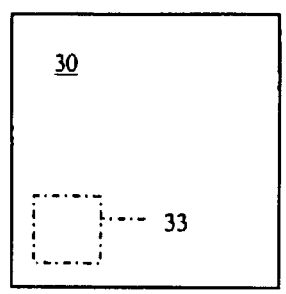
Figure 20:
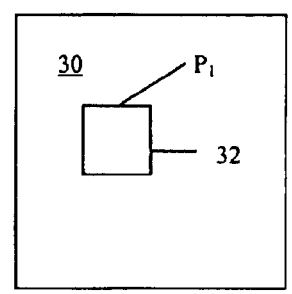

When the user moves the window to a new position, the prior art magnifying software updates the window position by performing a series of steps as illustrated in FIGS. 20(a)–20(c). FIG. 20(a) shows an initial position of window 32 designated as $P_0$. When the user begins to drag the window to a new position, the program first removes the initial window $P_0$. Next, the program restores to the screen the original image region covered by window $P_0$ (dashed area 33 in FIG. 20(b)). After calculating the next region of the original image covered by the new window position $P_1$, the program magnifies that region and displays it within the window position $P_1$. Although FIGS. 20(a)–20(c) can only illustrate this updating process as two distinct window positions, it will be understood that the updating process occurs continuously as the user moves the magnifying window 32 across the viewing screen. The actual speed at which the individual updates occur will depend on factors such as the processing speed of the computer and the complexity of the image. If the updates do not occur with sufficient rapidity, the user will be able to detect discontinuities in successive window positions as the window moves across the screen. This phenomenon is commonly referred to as "flicker." Flicker is not only aesthetically undesirable, but for health care providers who must view medical images during an entire work day, flicker can significantly contribute to viewer distraction and fatigue. Additionally, magnifying an image may tend to blur or distort the image. Prior art magnifying programs typically fail to optimize the contrast of the enlarged portion of the image and fail to filter distortions caused by the magnification. A magnifying window program which reduces flicker and reduces distortions cause by magnification would be a significant improvement in the art.

Figure 22:
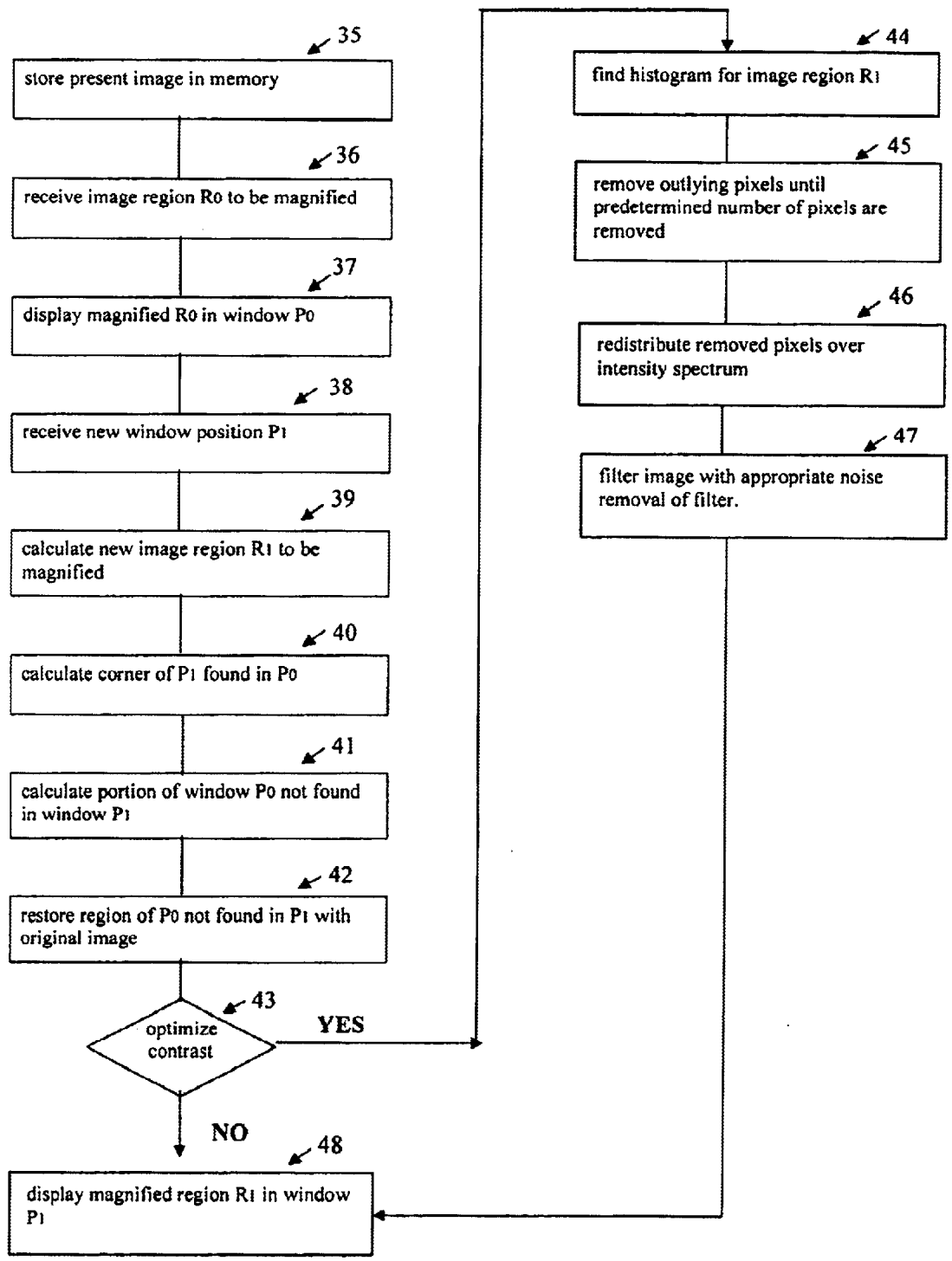
FIG. 22 is a flow chart of the improved method of updating the magnifying window in accordance with the present invention.
Figure 21:
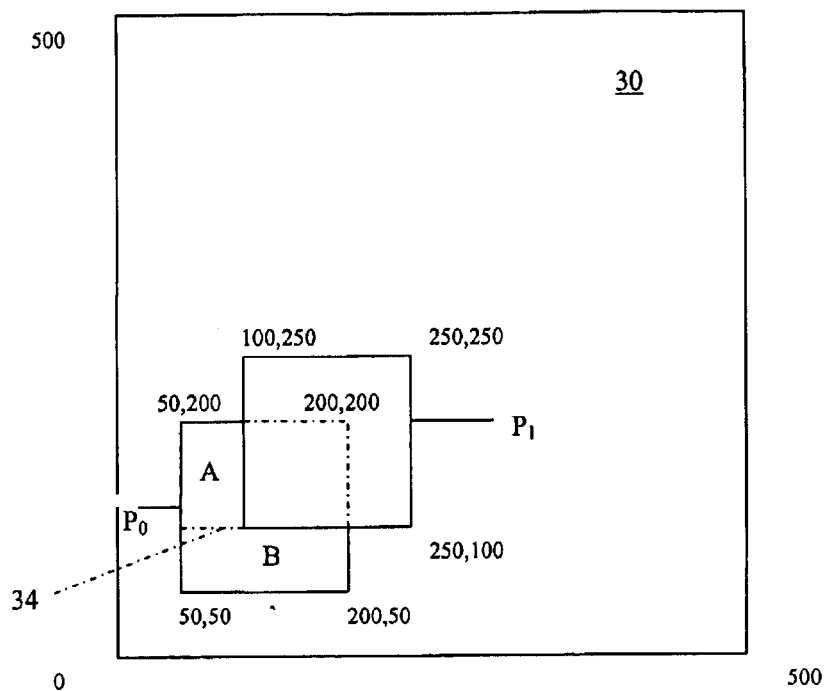
FIG. 21 illustrates the improved method of updating the magnifying window in accordance with the present invention.

FIG. 21 illustrates an improved update method for a magnifying window and FIG. 22 shows a flow chart for carrying out this method. As a simplified example, FIG. 21 represents a 500×500 pixel screen 30 with an initial window position $P_0$ and an updated window position $P_1$ moved 50 pixels upwards and to the left. It will be understood that in actual operation, the window $P_1$ would be updated after moving only a small distance equal to a few pixel positions, since mouse positions are sampled very frequently. However, to make the illustration clearer, FIG. 21 is shown with an exaggerated change in distance between windows $P_0$ and $P_1$. FIG. 22 illustrates the first step 35 in the method is to store the original image in memory. When the magnifying window routine is called, the program will first determine the region ($R_0$) of the original image to be magnified (step 36) and then display the region $R_o$ (as magnified) in initial window position $P_0$ (step 37). When the user next moves the magnifying window to a new position, the program will receive the new window position $P_1$ and then calculate new region $R_1$ to be magnified (steps 38 and 39). Next the program determines in step 40 which corner of $P_1$ is found in $P_0$. As suggested in FIG. 21, the corner located at the pixel position (100,100) is the corner of $P_1$ found in $P_0$. With this information and the pixel positions of the $P_0$ corners, the program in step 41 is able to define two rectangular regions A and B which are the portions of $P_0$ no longer covered by $P_1$. The program then retrieves from memory the original image information for the regions A and B and only needs to restore the original image to these areas rather than to the entire area of $P_0$. With frequent magnifying window updates, the areas of rectangles A and B are much smaller compared to that of $P_0$. Therefore, this method of restoring only the regions A and B greatly reduces the likelihood that any type of flicker will be perceived by the magnifying window user.

Figures 23A, 23B, 23C:
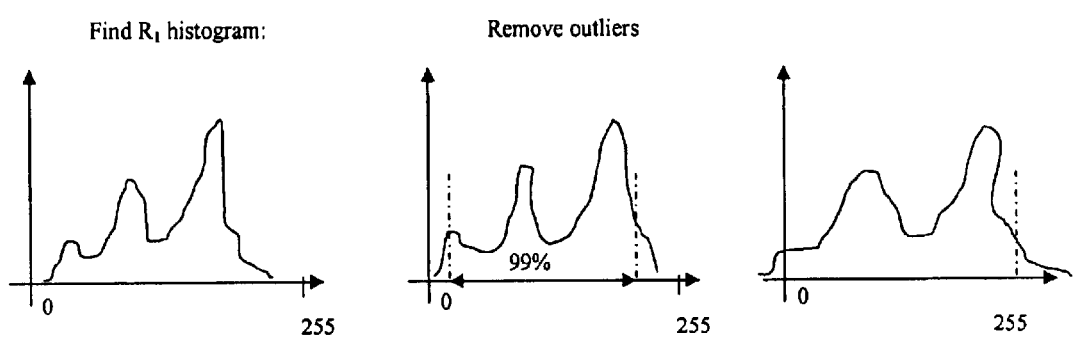
FIGS. 23($a$)–23($c$) illustrate methods of optimizing contrast in the magnified image of the present invention.

Additionally, the magnifying window of the present invention allows further processing of the image as indicated by steps 43–47 in FIG. 22. When the user wishes to optimize the contrast and filter the magnified image, he or she may select this further processing option by activating the appropriate indicator which will appear on or next to the magnifying window. As indicated in steps 43–47, this processing will include optimizing the contrast by removing outlying pixels and redistributing the pixels over the intensity range of the display system. FIGS. 23(a)–23(c) graphically illustrate this processing. In FIG. 23(a), a histogram of the image region being magnified is produced by plotting pixel intensity versus the frequency at which pixels of that intensity occur. In these figures, the intensity scale ranges from 0 to 255. FIG. 23(b) represents how a given percentage of the total pixels will be removed from the extreme ends of the intensity scale. In the illustrated example, the outlying 1% of the pixels are removed, however, a lesser or greater percentage of the outlying pixels could be removed depending on the degree to which it is desired to enhance contrast. FIG. 23(c) illustrates how the image region is re-scaled to distribute the remaining pixel over the entire 0 to 255 intensity range. After enhancing the contrast of the image region, step 47 in FIG. 22 shows how filtering of the image region will take place before the image region is displayed in window $P_1$. While various forms of filtering may be implemented, it has been found that a conventional median filter provides favorable results. As those skilled in the art will recognize, median filters operate by examining the neighborhood intensity values of a pixel and replacing that pixel with the median intensity value found in that neighborhood. The application of different filters transforms a conventional magnifying glass into a more powerful image analysis instrument. This is particularly beneficial when large images are analyzed, and processing the entire image becomes a time-consuming and unnecessary process.

Computer programs based on all of the methods and pseudo code disclosed above can be run on any number of modern computers systems having a suitable computer processor and a sufficient quantity of computer-readable storage medium. Although certain preferred embodiments have been described above, it will be appreciated by those skilled in the art to which the present invention pertains that modifications, changes, and improvements may be made without departing from the spirit of the invention as defined by the claims. All such modifications, changes, and improvements are intended to come within the scope of the present invention.

We claim:

1. In a computer system including a computer processor, a memory, and a display screen, a method of reducing flicker caused by a magnifying window moving across an image on said display screen, said method comprising the steps of:
   a. storing said image in said memory;
   b. storing a first window position in said memory;
   c. reading a second window position, which overlaps said first window position;
   d. determining what portion of said first window position is not covered by said new window position; and
   e. restoring from memory that portion of said image which corresponds to said portion of said first window not covered by said second window.

2. The method according to claim 1, further including the step of filling said first and second window positions with a magnified portion of said image.

3. The method according to claim 1, wherein said step of determining what portion of said first window position is not covered by said new window position further includes the step of dividing said uncovered portion into two rectangles.

4. The method according to claim 1, further including the step of removing outlying pixel values from a region of said image to be magnified and redistributing remaining pixel values of said region across an intensity spectrum of said computer system.

5. The method of claim 4, further including the step of applying a median filter to said region of said image to be magnified.

6. In a computer system including a computer processor, a memory, and a display screen having an intensity range, a method of reducing distortions caused by magnification of an image on said display screen, said method comprising the steps of:

a. storing said image in said memory;

b. identifying a portion of said image in a window;

c. magnifying said portion of said image; and d. optimizing the contrast of said portion of said image by the removal of outlying pixels and the redistribution of remaining pixels over said intensity range of said display screen.

7. The computer system according to claim 6 wherein a filter is applied to said portion of said image which has been magnified.

8. The computer system according to claim 7 wherein said filter is a median filter.

\* \* \* \* \*